(12) United States Patent
Do et al.

(10) Patent No.: US 12,530,871 B2
(45) Date of Patent: Jan. 20, 2026

(54) METHOD, APPARATUS, AND STORAGE MEDIUM FOR ENCODING AND DECODING FEATURE MAPS BASED ON COMPRESSED FEATURE FRAME INFORMATION

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Ji-Hoon Do, Daejeon (KR); Hyoung-Jin Kwon, Daejeon (KR); Dong-Hyun Kim, Daejeon (KR); Youn-Hee Kim, Daejeon (KR); Jong-Ho Kim, Daejeon (KR); Joo-Young Lee, Daejeon (KR); Woong Lim, Daejeon (KR); Se-Yoon Jeong, Daejeon (KR); Jin-Soo Choi, Daejeon (KR); Tae-Jin Lee, Daejeon (KR); Seong-Bae Rhee, Yongin-si (KR); Kyu-Heon Kim, Seoul (KR); Jun-Sik Kim, Yongin-si (KR)

(73) Assignees: ELECTRONICS AND TELECOMMUNICATIONS RESEARCH INSTITUTE, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 307 days.

(21) Appl. No.: 17/896,958

(22) Filed: Aug. 26, 2022

(65) Prior Publication Data
US 2023/0070216 A1 Mar. 9, 2023

(30) Foreign Application Priority Data

Aug. 27, 2021 (KR) .................. 10-2021-0114157
Sep. 30, 2021 (KR) .................. 10-2021-0130172
Aug. 25, 2022 (KR) .................. 10-2022-0107125

(51) Int. Cl.
*G06V 10/77* (2022.01)
*G06T 9/00* (2006.01)
*G06V 10/82* (2022.01)

(52) U.S. Cl.
CPC .......... *G06V 10/7715* (2022.01); *G06T 9/002* (2013.01); *G06V 10/82* (2022.01)

(58) Field of Classification Search
CPC .............................. G06V 10/82; G06V 20/46
See application file for complete search history.

(56) References Cited

U.S. PATENT DOCUMENTS 10,733,767 B2   8/2020  Cho et al.
2018/0350110 A1*  12/2018  Cho .................. G06F 7/08
(Continued)

FOREIGN PATENT DOCUMENTS

CN   112508125 A   *  3/2021
KR   102301232 B1    9/2021

OTHER PUBLICATIONS

Lim et al., Foreground segmentation using convolutional neural networks for multiscale feature encoding, Pattern Recognition Letters, vol. 112, Sep. 1, 2018, pp. 256-262, doi: 10.1016/j.patrec.2018.08.002.*

*Primary Examiner* — Guillermo M Rivera-Martinez
(74) *Attorney, Agent, or Firm* — Sughrue Mion, PLLC

(57) ABSTRACT

Disclosed herein are a method, an apparatus and a storage medium for processing a feature map. An encoding method for a feature map includes configuring a feature frame for feature maps, and generating encoded information by per- (Continued)

forming encoding on the feature frame. A decoding method for a feature map includes reconstructing a feature frame by performing decoding on encoded information, and reconstructing feature maps using the feature frame. A feature frame is configured using feature maps, and compression using a video compression codec or a deep learning-based image compression method is applied to the feature frame.

16 Claims, 40 Drawing Sheets

(56) References Cited

U.S. PATENT DOCUMENTS

| | | | |
|---|---|---|---|
| 2019/0246102 A1 | 8/2019 | Cho et al. | |
| 2020/0092556 A1* | 3/2020 | Coelho | H04N 19/124 |
| 2020/0097802 A1* | 3/2020 | Gudovskiy | G06N 3/063 |
| 2020/0351509 A1* | 11/2020 | Lee | G06N 3/04 |
| 2020/0374522 A1* | 11/2020 | Zhou | H04N 19/94 |

* cited by examiner

|  |  | NUMBER OF ALLOCATED FEATURE MAPS IN HORIZONTAL DIRECTION | | | | |
|---|---|---|---|---|---|---|
|  |  | 1 | 2 | 4 | 8 | 16 |
| NUMBER OF ALLOCATED FEATURE MAPS IN VERTICAL DIRECTION | 1 | 25.14 % | 25.13 % | 25.10 % | 25.18 % | 26.55 % |
|  | 2 | 25.10 % | 25.08 % | 25.16 % | 26.51 % | 29.93 % |
|  | 4 | 25.06 % | 25.16 % | 26.51 % | 29.92 % | 38.49 % |
|  | 8 | 25.15 % | 26.53 % | 29.93 % | 38.50 % | 57.91 % |
|  | 16 | 26.53 % | 29.94 % | 38.51 % | 57.92 % | 100 % |

[ COMPRESSION ]

FIG. 20

|  |  | NUMBER OF ALLOCATED FEATURE MAPS IN HORIZONTAL DIRECTION | | | | |
|---|---|---|---|---|---|---|
|  |  | 1 | 2 | 4 | 8 | 16 |
| NUMBER OF ALLOCATED FEATURE MAPS IN VERTICAL DIRECTION | 1 | 33.53dB | 34.38dB | 34.35dB | 34.36dB | 34.43dB |
|  | 2 | 34.40dB | 34.39dB | 34.39dB | 34.46dB | 34.67dB |
|  | 4 | 34.39dB | 34.39dB | 33.47dB | 34.68dB | 35.29dB |
|  | 8 | 34.39dB | 34.47dB | 34.68dB | 35.28dB | 36.80dB |
|  | 16 | 34.46dB | 34.67dB | 35.28dB | 36.81dB | 40.34dB |

[PSNR]

FIG. 21

EXAMPLE OF FEATURE MAP SORTING ORDER

| FEATURE MAP |  |  |  |  |  | ... |  | |  |
|---|---|---|---|---|---|---|---|---|---|
| NUMBER SORTING | #1 | #2 | #3 | #4 | #5 | ... | #60 | ... | #255 |

SPATIAL PRIORITY ALLOCATION

TEMPORAL PRIORITY ALLOCATION

| SEI MESSAGE | NAL TYPE |
|---|---|
| FEATURE MAP QUANTIZATION | NAL_PREFIX_NSEI |
| FEATURE MAP ALIGNMENT | NAL_PREFIX_NSEI |

FIG. 34

| feature_map_quantization ( payloadSize ) { | Descriptor |
|---|---|
| fmq_type | u(3) |
| if( fmq_type == 0 ) { /*non-quantization*/ | |
| } else if ( fmq_type == 1 ) { /* min-max quantization*/ | |
| fmq_min | i(v) |
| fmq_max | i(v) |
| } else if ( fmq_type ==2 ) { /* max-range quantization*/ | |
| fmq_max_range | fl(v) |
| } else if ( fmq_type ==3 ) { /* predefined quantization */ | |
| fmq_num_parameters | u(v) |
| for ( i = 0; i < fmq_num_parameters; i++ ) { | |
| fmq_parameter[i] | fl(v) |
| } | |
| } | |
| fmq_bitdepth | u(v) |
| } | |

FIG. 35

| fmq_type | DESCRIPTION |
|---|---|
| 0 | NON-QUANTIZATION |
| 1 | MIN-MAX QUANTIZATION |
| 2 | MAX-RANGE QUANTIZATION |
| 3 | PREDEFINED QUANTIZATION |
| 4~7 | (RESERVED) |

FIG. 36

| feature_map_align ( payloadSize ) { | Descriptor |
|---|---|
| fma_num_maps_width_minus1 | ue(v) |
| fma_num_maps_height_minus1 | ue(v) |
| fma_sorting_flag | u(1) |
| if( fma_sorting_flag ) { | |
| for( i = 0; i < nframes; i++ ) { | |
| for( u = 0; u < fma_num_width_maps; u++ ) { | |
| for( v = 0; v < fma_num_height_maps; v++ ) { | |
| fma_pre_idx[i][u][v] | u(v) |
| } | |
| } | |
| } | |
| } | |
| fma_align_type | u(3) |
| if ( fma_align_type == 1 ) { | |
| for ( i = 0; i < nframes; i++ ) { | |
| fma_multi_channel_feature_map_idx[i] | u(v) |
| } | |
| } | |
| } | |

FIG. 37

| fma_align_type | DESCRIPTION |
|---|---|
| 0 | SORTING USING SINGLE FRAME |
| 1 | SORTING USING MULTI-FRAMES |
| 2~7 | (RESERVED) |

FIG. 38

METHOD, APPARATUS, AND STORAGE MEDIUM FOR ENCODING AND DECODING FEATURE MAPS BASED ON COMPRESSED FEATURE FRAME INFORMATION

CROSS REFERENCE TO RELATED APPLICATIONS

This application claims priority to Korean Patent Application Nos. 10-2021-0114157, filed Aug. 27, 2021, 10-2021-0130172, filed Sep. 30, 2021, and 10-2022-0107125, filed Aug. 25, 2022, which are hereby incorporated by reference in their entireties into this application.

BACKGROUND OF THE INVENTION

1. Technical Field

The present disclosure relates to a method, an apparatus, and a storage medium for processing a feature map. More particularly, the present disclosure relates to a method, an apparatus, and a storage medium for compressing a feature map.

2. Description of the Related Art

Recently, with the development of a storage device and a computation device, an Artificial Intelligence (AI) system has been rapidly developed.

Deep learning network technology is element technology for implementing artificial intelligence.

A deep learning network based on a convolutional neural network classifies features of input data by itself and learns the features, thus improving task performance.

With the development of performance of deep learning network technology, the number of persons who desire to store, train, and execute a deep learning network on their personal/client devices has increased.

However, in order to configure such a deep learning network, millions, tens of millions or more variables and computation (operation) processes are required, thus making it difficult to store, train, and execute the deep learning network on personal/client devices having insufficient memory and computation ability.

Therefore, coding technology for machines (e.g., Video Coding for Machine; VCM) proposes a structure for locating a feature extraction unit of the deep learning network in a server guaranteeing memory and computation performance and for locating the remaining portion, that is, only a network for performing tasks, in a personal/client device, rather than a structure for storing, training, and utilizing the entirety of the deep learning network in each personal/client device.

In this case, a server transmits a feature map to the personal/client device, and the personal/client device performs tasks of the deep learning network using the feature map received from the server. By means of this transmission and performance, deep learning network technology may be utilized even in the personal/client device having insufficient memory and computation ability.

However, because feature maps transmitted to the personal/client device are two-dimensional (2D) data containing the features of input data, and a number of feature maps identical to the number of channels are generated in one layer, there is a limitation in that feature maps having a large capacity must be transmitted to the personal/client device.

SUMMARY OF THE INVENTION

An embodiment is intended to a provide an apparatus, a method, and a storage medium related to an artificial intelligence system that utilizes a deep learning network and an application of the artificial intelligence system.

An embodiment is intended to provide an apparatus, a method, and a storage medium, which compress a multi-channel feature map generated by a deep learning network based on a convolutional neural network (CNN).

An embodiment is intended to provide an apparatus, a method, and a storage medium, which efficiently compress the feature map of a deep learning network.

An embodiment is intended to provide an apparatus, a method, and a storage medium, which configure a feature frame and compress the configured feature frame, thus exhibiting higher performance relative to compression.

In accordance with an aspect, there is provided an encoding method, including configuring a feature frame for feature maps; and generating encoded information by performing encoding on the feature frame.

The encoding method may further include extracting the feature maps from a deep learning network.

The feature maps may be extracted from a layer of the deep learning network.

Normalized feature maps may be generated by performing normalization on the feature maps.

The feature frame may include multi-feature frames.

Which of a single feature frame and the multi-feature frames are to be generated using the feature maps may be determined based on a horizontal size of the feature maps, a vertical size of the feature maps, and a number of channels.

When it is determined that the multi-feature frames are to be generated, whether sorting of the feature maps is to be performed may be determined.

Whether the sorting is to be performed may be determined based on a size of the feature maps.

The sorting is performed based on average brightness values or local brightness values of the feature maps.

The feature maps may be sorted based on average brightness values of reduced feature maps generated by reducing the feature maps.

Sorted feature maps may be scanned in a specific order upon generating the multi-feature frames.

The multi-feature frames may be configured independently of respective multiple layers of a convolutional neural network.

Converted feature frame information may be generated by converting the feature frame into a format for compression.

Compressed feature frame information may be generated by compressing the converted feature frame information using a video compression codec or a deep learning-based image compression method.

In accordance with another aspect, there is provided a decoding method, including reconstructing a feature frame by performing decoding on encoded information; and reconstructing feature maps using the feature frame.

The feature frame may include multi-feature frames.

Whether reconstruction sorting of the feature maps is required may be determined upon reconstructing the feature frame.

The feature maps may be generated by splitting the feature frame.

Scan order information may be used upon generating the feature maps.

the scan order information may specify an order between the feature maps.

The encoded information includes compressed feature frame information,

Feature frame information may be generated by decompressing the compressed feature frame information.

The feature frame may be reconstructed using the feature frame information.

The decompression may be performed using a video compression codec or a deep learning-based image decompression method.

In a further aspect, there is a computer-readable storage medium storing a bitstream for decoding, the bitstream including encoded information, wherein a feature frame is reconstructed by performing decoding on the encoded information, and feature maps are reconstructed using the feature frame.

BRIEF DESCRIPTION OF THE DRAWINGS

FIG. 20 illustrates compressibility depending on the number of feature maps constituting a multi-feature frame in the present disclosure;

FIG. 21 illustrates the results of PSNR depending on the number of feature maps constituting a multi-feature frame in the present disclosure;

FIG. 34 illustrates an SEI message according to an example;

FIG. 35 illustrates the syntax of an SEI message for a feature map according to an example;

FIG. 36 illustrates the value of fmq_type according to an example;

FIG. 37 illustrates the syntax of an alignment SEI message for a feature map according to an example;

FIG. 38 illustrates the values of fma_align_type according to an example;

DESCRIPTION OF THE PREFERRED EMBODIMENTS

Figure 1:
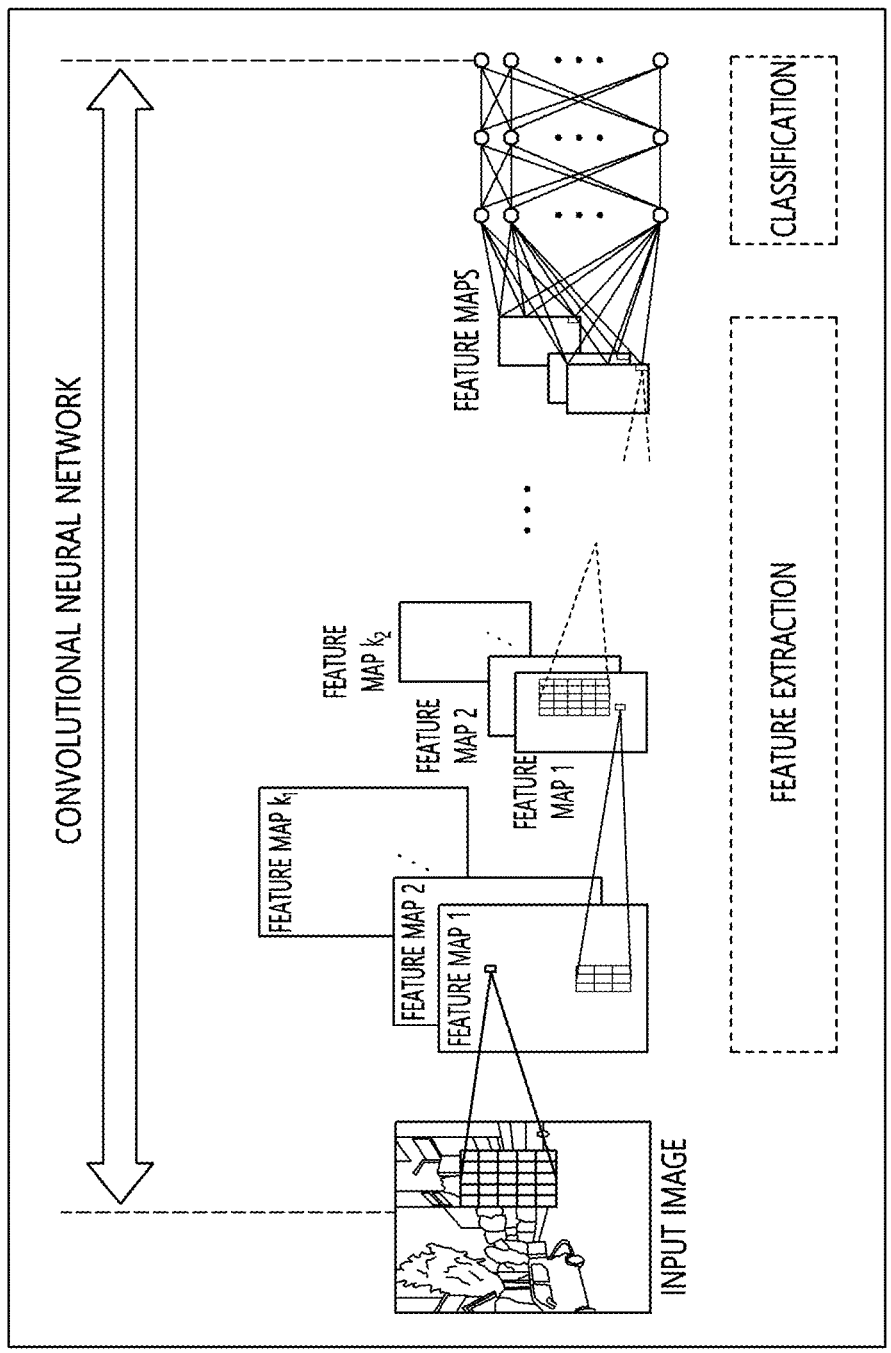
FIG. 1 illustrates the operation of a convolutional neural network according to an embodiment.

The present disclosure may have various changes and various embodiments, and specific embodiments will be illustrated in the attached drawings and described in detail below. However, this is not intended to limit the present disclosure to particular modes of practice, and it is to be appreciated that all changes, equivalents, and substitutes that do not depart from the spirit or technical scope of the present disclosure are encompassed in the present disclosure.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but are not necessarily mutually exclusive from each other. For example, specific shapes, structures, and characteristics described herein may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

In the present disclosure, it will be understood that, although the terms "first", "second", etc. may be used herein to describe various components, these components should not be limited by these terms. These terms are only used to distinguish one component from other components. For instance, a first component discussed below could be termed a second component without departing from the teachings of the present disclosure. Similarly, a second component could also be termed a first component. The term "and/or" includes any and all combinations of one or more of the associated listed items.

It will be understood that when a component is referred to as being "connected" or "coupled" to another component, it can be directly connected or coupled to the other component, or intervening components may be present. In contrast, it should be understood that when a component is referred to as being "directly coupled" or "directly connected" to another component, there are no intervening component present.

The components described in the embodiments are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present specification, as long as it does not depart from the essence of the present specification.

The terms used in embodiments are merely used to describe specific embodiments and are not intended to limit the present disclosure. A singular expression includes a plural expression unless a description to the contrary is specifically pointed out in context. In the embodiments, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. That is, it should be noted that, in embodiments, an expression describing that a component "comprises" a specific component means that additional components may be included in the scope of the practice or the technical spirit of the embodiments, but do not preclude the presence of components other than the specific component.

In embodiments, the term "at least one" means one of numbers of 1 or more, such as 1, 2, 3, and 4. In the embodiments, the term "a plurality of" means one of numbers of 2 or more, such as 2, 3, or 4.

Some components in embodiments are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments of the present disclosure are described with reference to the accompanying drawings in order to describe the present disclosure in detail so that those having ordinary knowledge in the technical field to which the present disclosure pertains can easily practice the present disclosure. In the following description of the present disclosure, detailed descriptions of known functions and configurations which are deemed to make the gist of the present disclosure obscure will be omitted. It should be noted that the same reference numerals are used to designate the same or similar components throughout the drawings, and that descriptions of the same components will be omitted.

Hereinafter, an image may be one of pictures forming a video, or may be a video itself. For example, "encoding and/or decoding of an image" may mean "encoding and/or decoding of a video", or may mean "encoding and/or decoding of one of images forming a video".

Hereinafter, the terms "video" and "motion picture(s)" may be used to have the same meaning, and may be used interchangeably with each other.

Hereinafter, a target image may be an encoding target image that is the target to be encoded and/or a decoding target image that is the target to be decoded. Further, a target image may be an input image that is input to an encoding apparatus or an input image that is input to a decoding apparatus. Further, the target image may be a current image that is the target to be currently encoded and/or decoded. For example, the terms "target image" and "current image" may be used to have the same meaning, and may be used interchangeably with each other.

Hereinafter, the terms "image", "picture", "frame", and "screen" may be used to have the same meaning, and may be used interchangeably with each other.

Task performance, described in embodiments, may include all of technology for acting like a human being, such as object detection, object tracking, and scene semantics, and application technology such as super resolution and image compression.

Embodiments may be element technology supporting Video Coding for Machine (VCM), and may relate to technology for compressing feature maps transmitted from a server to a personal/client device.

Generally, because data loss occurs due to compression of data, a problem may arise in that the use of compressed feature maps deteriorates the task performance of a deep learning network. Therefore, there is required feature map compression technology for preventing the task performance of the deep learning network from being greatly deteriorated even if compressed feature maps are used.

Embodiments provide a method for compressing multi-channel feature maps, which stores only a partial network located in a latter portion of the entire deep learning network or a portion for performing tasks in the personal/client device, without storing the entire deep learning network in the personal/client device, thus preventing the task performance of the deep learning network from being greatly deteriorated during a process of performing tasks in the deep learning network.

In the embodiments, a feature frame configuration method may be applied to multi-channel feature maps extracted from a convolutional neural network, and thus the multi-channel feature maps may be compressed. Below, such configuration, extraction, and compression will be described in detail.

FIG. 1 illustrates the operation of a convolutional neural network according to an embodiment.

In FIG. 1, feature maps of the convolutional neural network, a convolution operation process for the feature maps, and performance of tasks in the deep learning network using the feature maps are illustrated.

The deep learning network based on the convolutional neural network classifies features of input data by itself and learns the features, thus improving task performance.

The deep learning network may be composed of a large number of layers. Each feature map in each layer may be defined as a convolution operation on input data (or a feature map) in a previous layer, and kernels.

In other words, feature maps and kernels in the current layer may be the inputs of the convolution operation, and the output of the convolution operation (i.e., the result value of the convolution operation) may be defined as the feature map of a subsequent layer.

Here, in the process of the convolution operation, a stride may be utilized, and various types of processing, such as pooling and an activation function, may be applied to the result value of the convolution operation.

As described above, a process of sequentially generating feature maps ranging from input data to the last layer may be defined as forward propagation. Forward propagation may be a basic procedure of the convolutional neural network which utilizes the features of input data.

Due to such characteristics of the convolutional neural network, feature maps in the last layer may include important features of the input data. Because the feature maps in the last layer include important features of the input data, the task performance unit of the deep learning network may perform various element technologies such as recognition, tracking, and understanding, by utilizing the feature maps generated in the last layer.

Figure 2:
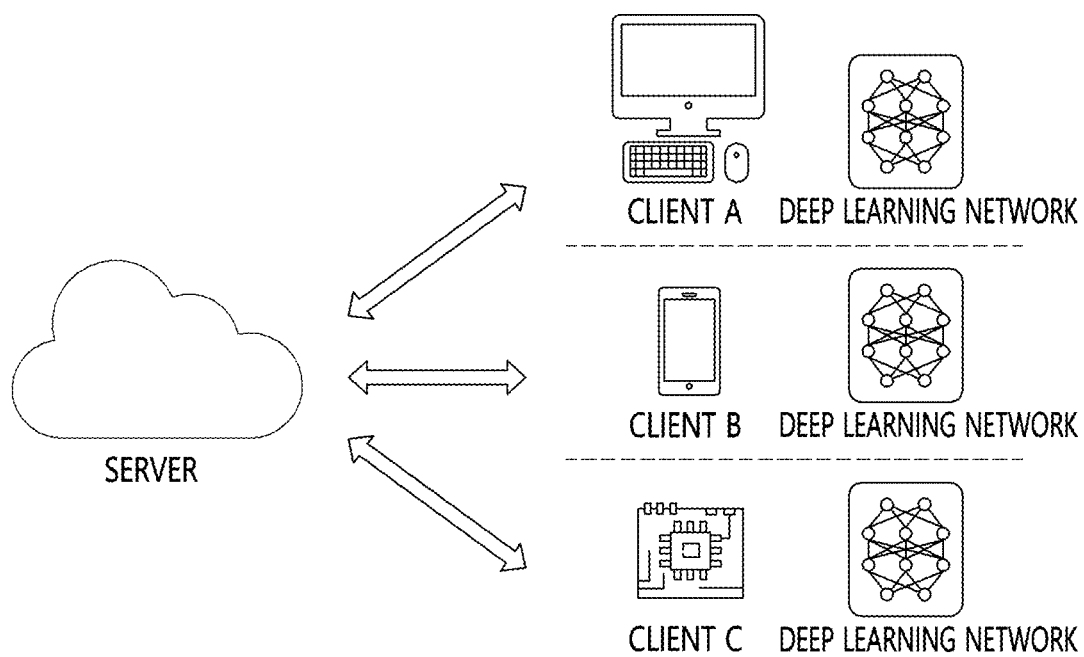
FIG. 2 illustrates a model in which a deep learning network is located at a client end according to an example.
Figure 3:
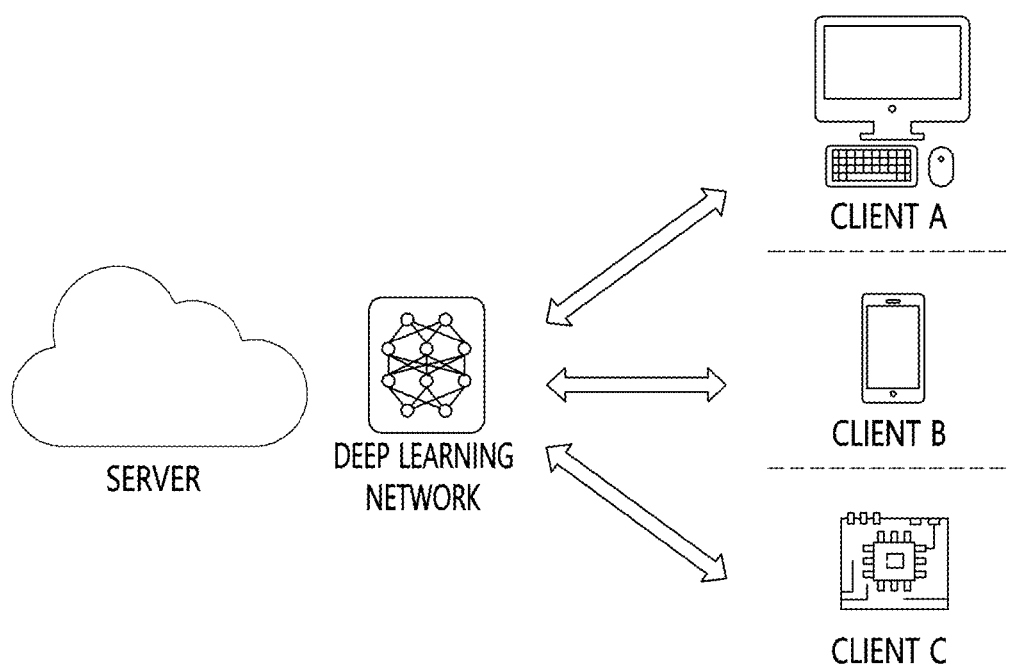
FIG. 3 illustrates a model in which a deep learning network is located at a server end according to an example.
Figure 4:
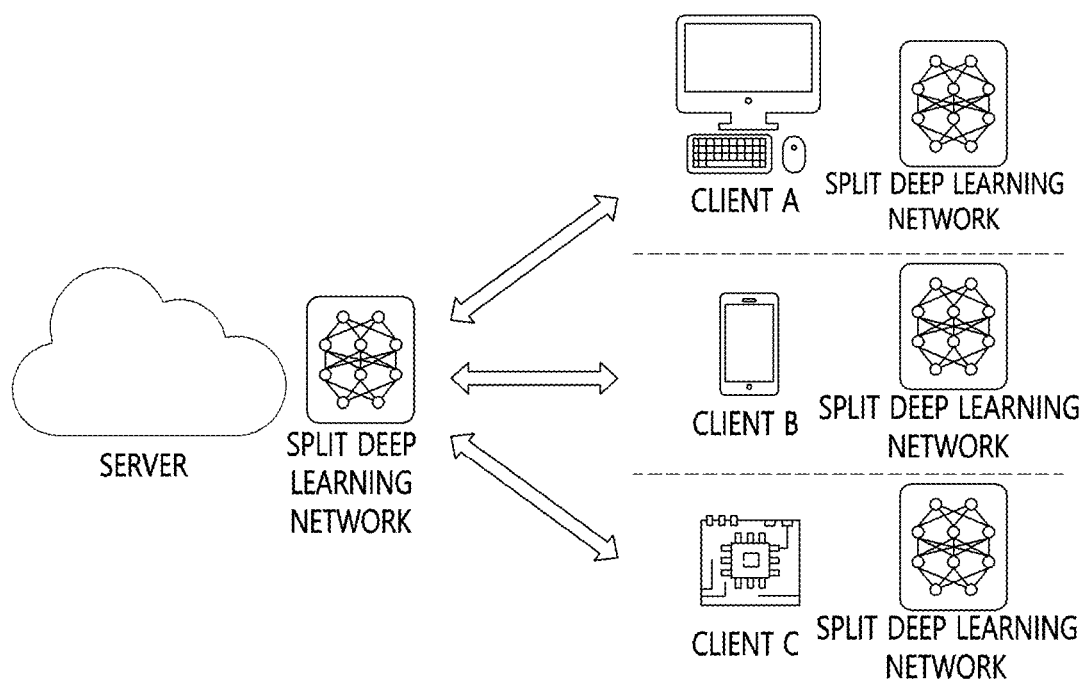
FIG. 4 illustrates a model in which a deep learning network is split into a server end and a personal/client device end, and split deep learning networks are respectively located in the server and the personal/client device.

FIGS. 2, 3, and 4 illustrate the service models of a deep learning network according to an example.

The service models of the deep learning network illustrated in FIGS. 2, 3, and 4 may be classified depending on the location of the deep learning network.

FIG. 2 illustrates a model in which a deep learning network is located at a client end according to an example.

As illustrated in FIG. 2, when the deep learning network is located at a client end, the deep learning network may be trained, stored, and executed in the personal/client device.

Because, in the model or structure such as that illustrated in FIG. 2, the deep learning network is trained, stored, and executed in the personal/client device regardless of the server, the model or structure may have advantages in that time delay and error attributable to data transmission do not occur, and the personal/client device may immediately utilize the deep learning network.

Owing to the above-described advantages, such a model or structure may be utilized in service such as autonomous driving.

However, generally, in the deep learning network, millions, tens of millions or more variables and computation (operation) processes may be required. Therefore, in order for the personal/client device to train, store, and execute the deep learning network depending on the model or structure, there may be a limitation in that the personal/client device must be provided with high performance.

FIG. 3 illustrates a model in which a deep learning network is located at a server end according to an example.

As illustrated in FIG. 3, the model in which the deep learning network is located at the server end may have a structure in which the deep learning network is trained, stored, and executed in the server, and only the results of the training, storage, and execution are transmitted to the personal/client device. This structure may overcome the limitation in that the personal/client device cannot train, store, and execute the deep learning network due to the limited performance of the personal/client device.

Such a model or structure may be free from the problem such as the limited performance of the personal/client device because the deep learning network is present in the server and only the results of the deep learning network are transmitted to the personal/client device.

However, because the results of task performance by the deep learning network, received from the server, are result values predefined by the server, the personal/client device is restricted in variously utilizing the result values. Further, although the personal/client device requests a new result value in order to utilize the new result value in a specific manner, the server may belatedly respond to such a request.

At the present time, because technology for utilizing the convolutional neural network performs a single task such as object detection, recognition or tracking, a great restriction may not be applied even if the personal/client device performs a task based on the results transmitted from the server. However, when the personal/client device simultaneously performs various tasks with the development of deep learning technology in the future, the model or structure in which only the result values are transferred from the server may not be suitable for a scheme in which the personal/client device performs various tasks.

FIG. 4 illustrates a model in which a deep learning network is split into a server end and a personal/client device end and split deep learning networks are respectively located in the server and the personal/client device.

In a distribution structure of the deep learning network such as that illustrated in FIG. 4, the server and the personal/client device may have slit deep learning networks, respectively.

As the deep learning network is split into those for the server and the personal/client device, such a model or structure may be configured such that 1) the amount of memory and computation performance required by the personal/client device to train, store, and perform deep learning may be reduced, and 2) tasks desired to be utilized by the personal/client device may be easily established.

Figure 5:
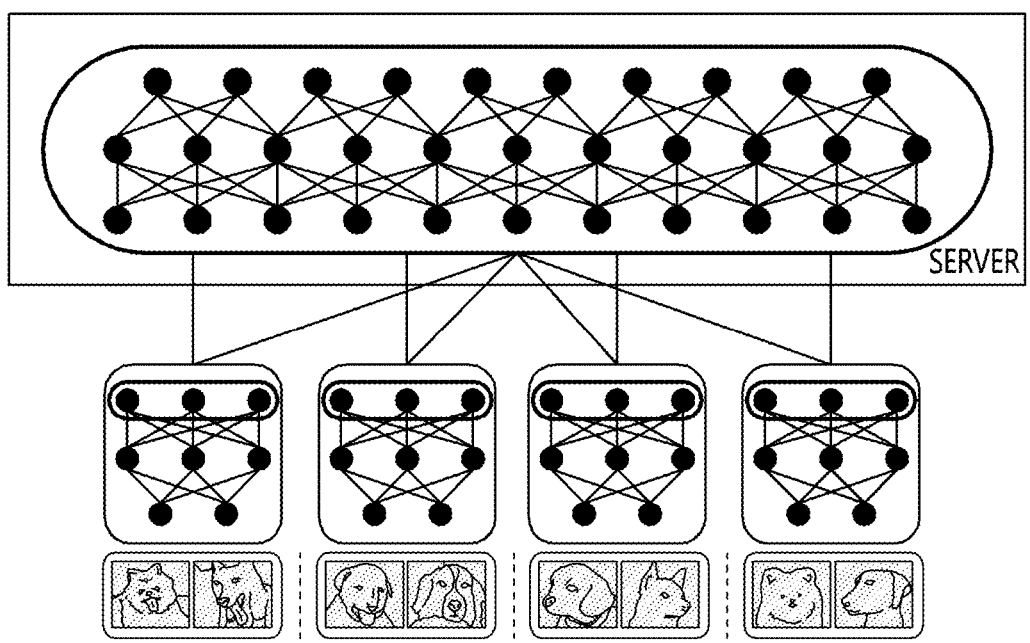
FIG. 5 illustrates split learning according to an example.

FIG. 5 illustrates separate learning according to an example.

Separate learning technology such as that illustrated in FIG. 5 may correspond to a detailed example of the model, described above with reference to FIG. 4, in which the server and the personal/client device have split deep learning networks.

This model may be disclosed as a structure in which the server and the personal/client device perform training (learning) while sharing data with each other.

In such a model or structure, multiple personal/client devices individually perform training using their own data, and the results of such training are integrated by the server, and thus training of the deep learning network may be performed using a more variety of data compared to the case where only of the server and the personal/client device performs training.

Furthermore, according to the model and structure, in the personal/client device, only the task performance unit of the deep learning network is arranged, and an application in which the personal/client device utilizes feature maps transmitted from the server may also be implemented.

However, in order to support the procedures described with reference to FIGS. 4 and 5, a process in which intermediate results calculated by the deep learning network located in the server are transmitted to the personal/client device may be required. In this case, the amount of data to be transmitted may be considerably large. Therefore, the model or structure may have a limitation in that a large amount of data must be transmitted from the server to the personal/client device.

Figure 6:
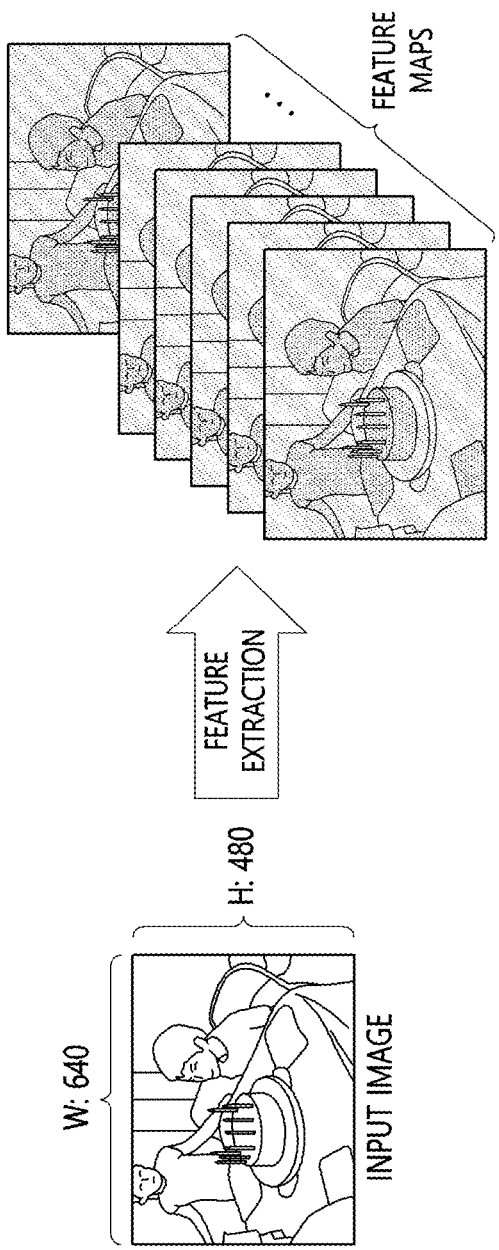
FIG. 6 illustrates a size limit for data to be transmitted by a server to a personal/client device in a structure in which the server and the personal/client device have split deep learning networks.

FIG. 6 illustrates a size limit for data to be transmitted by a server to a personal/client device in a structure in which the server and the personal/client device have split deep learning networks.

As illustrated in FIG. 6, when an input image is utilized in the deep learning network, the number of feature maps generated in each layer may be equal to the number of channels in the corresponding layer.

Further, because each feature map is two-dimensional (2D) data, the horizontal size and vertical size of which are defined through a convolution operation using its own previous feature map and kernels, the total data size of multi-channel feature maps transmitted from the server to the personal/client device may be much greater than the size of data required to transmit one input image.

Figure 7:
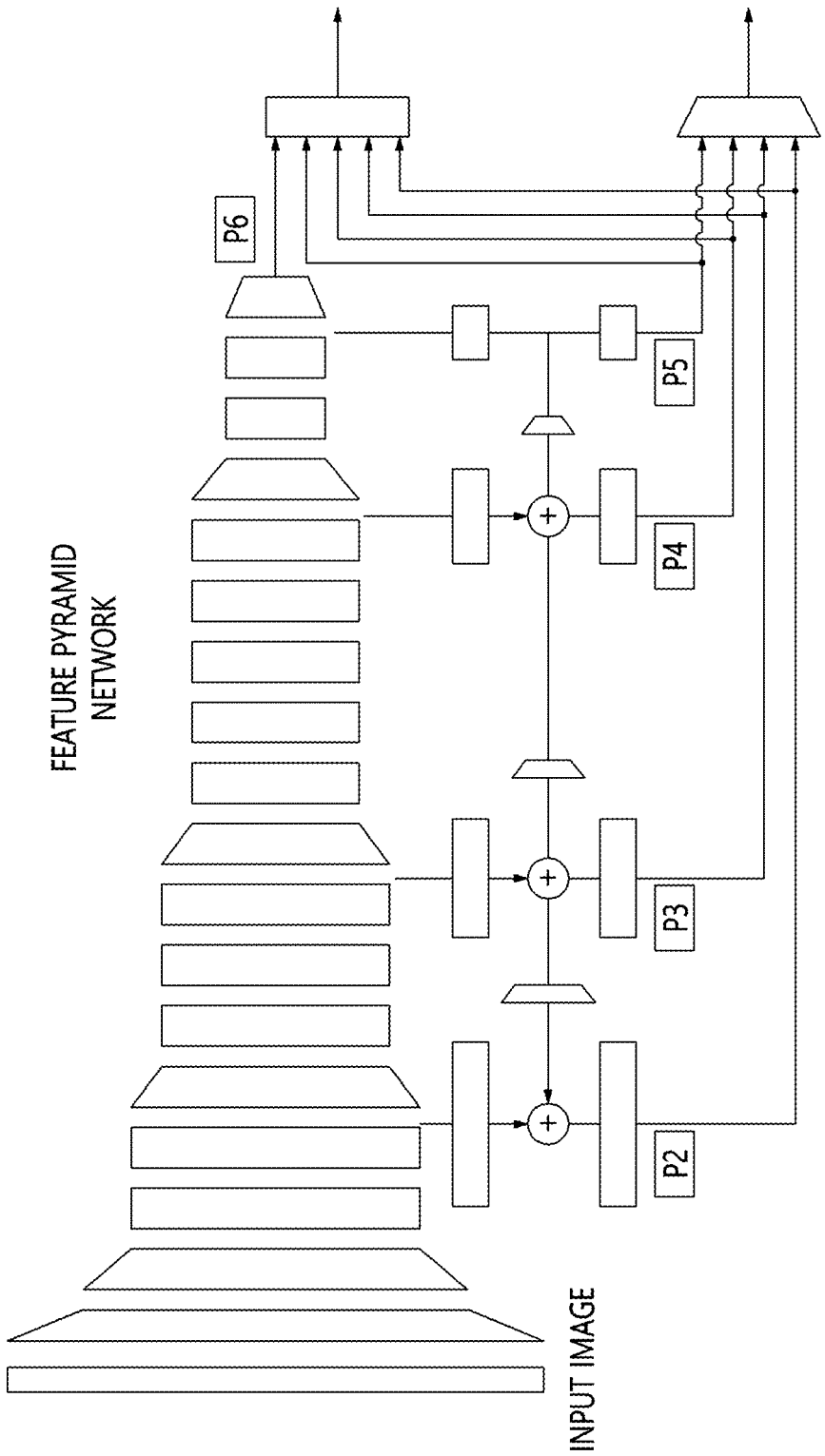
FIG. 7 illustrates the case where a multi-channel feature map to be generated depending on the design structure of the deep learning network based on a convolutional neural network is generated in multiple hierarchies according to an example.

FIG. 7 illustrates the case where a multi-channel map to be generated depending on the design structure of a deep learning network based on a convolutional neural network is generated in multiple hierarchies according to an example.

As illustrated in FIG. 7, depending on the design structure of the deep learning network based on a convolutional neural network, all of multi-channel feature maps generated by multiple layers, rather than by one layer, must be able to be transmitted.

Due to these features, in order to split the deep learning network into networks for the server and the personal/client device and allow the server and the personal/client device to utilize the split deep learning networks, technology for efficiently compressing large-capacity feature map data may be required.

Figure 8:
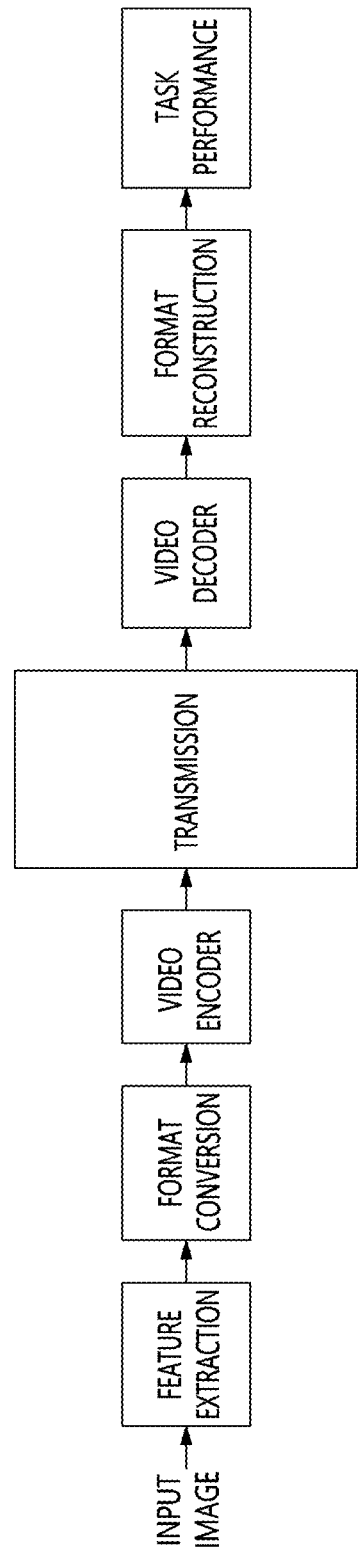
FIG. 8 illustrates VCM according to an embodiment.

FIG. 8 illustrates VCM according to an embodiment.

In order to overcome a limitation in that data of feature maps to be transmitted is large in a structure for splitting a deep learning network into networks for a server and a personal/client device and utilizing the split deep learning networks, VCM according to the embodiment may compress the feature maps or information of the feature maps. In the embodiments, the terms "split" and "partitioned" may be used to have the same meaning, and may be used interchangeably with each other. The terms "split" and "partition" may be used to have the same meaning, and may be used interchangeably with each other.

As illustrated in FIG. 8, the VCM may perform processes, such as feature extraction, format conversion, and video encoding for an input image, so as to compress the feature maps, and may transmit the compressed feature maps.

The personal/client device may utilize the task performance unit of the deep learning network by performing processes such as video decoding and format reconstruction for a received bitstream.

Embodiments, which will be described later, may disclose a method for compressing feature maps transmitted from the server to the personal/client device in a structure in which the deep learning network is split into networks for the server and the personal/client device and in which the server and the personal/client device utilize the split deep learning networks. The processes in the VCM, described above with reference to FIG. 8, may also be applied to embodiments, which will be described later.

Figure 9:
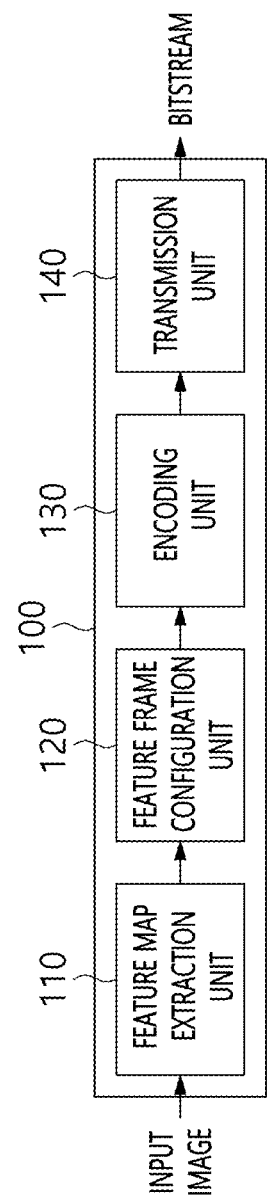
FIG. 9 is a configuration diagram of an encoding apparatus according to an embodiment.

FIG. 9 is a configuration diagram of an encoding apparatus according to an embodiment.

An encoding apparatus 100 may be an apparatus for compressing feature maps extracted from a deep learning network and generating a bitstream including information about the compressed feature maps.

The encoding apparatus 100 may include a feature map extraction unit 110, a feature frame configuration unit 120, an encoding unit 130, and a transmission unit 140.

The operations and functions of the feature map extraction unit 110, the feature frame configuration unit 120, the encoding unit 130, and the transmission unit 140 will be described in detail below.

Figure 10:
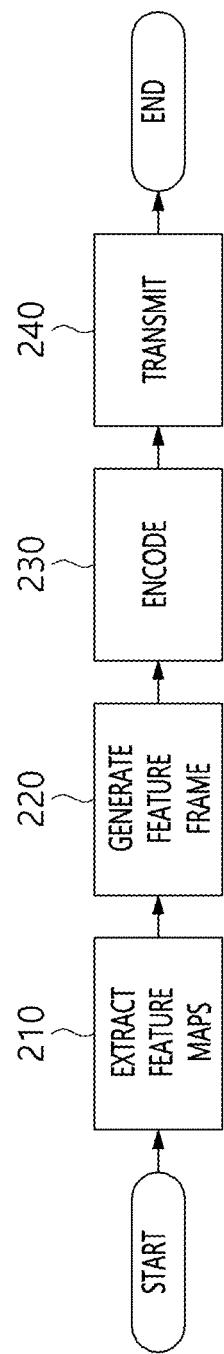
FIG. 10 is a flowchart of an encoding method according to an embodiment.

FIG. 10 is a flowchart of an encoding method according to an embodiment.

At step 210, the feature map extraction unit 110 may extract feature maps from a deep learning network.

At step 220, the feature frame configuration unit 120 may configure a feature frame for the extracted feature maps.

At step 230, the encoding unit 130 may generate encoded information by performing encoding on the feature frame.

The encoding unit 130 may generate reconstruction information. A bitstream or the encoded information may include reconstruction information. The reconstruction information may be information used to reconstruct the feature frame and the feature maps.

The encoding unit 130 may generate a bitstream including the encoded information.

At step 240, the transmission unit 140 may transmit the bitstream including the encoded information to another apparatus such as a decoding apparatus 300.

The transmission unit 140 may store the bitstream including the encoded information in a computer-readable storage medium.

Figure 11:
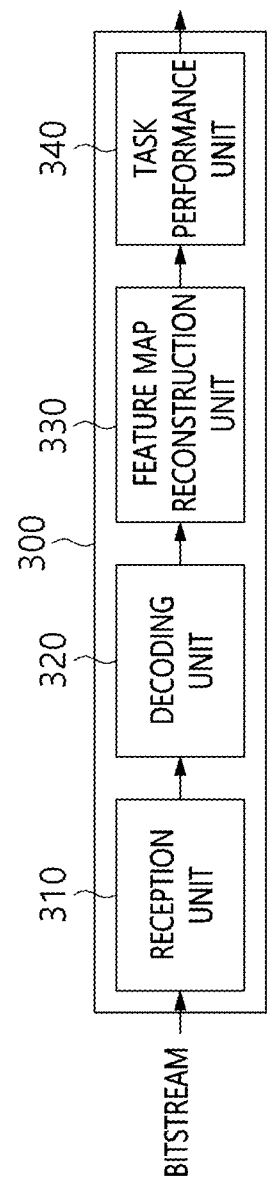
FIG. 11 is a configuration diagram of a decoding apparatus according to an embodiment.

FIG. 11 is a configuration diagram of a decoding apparatus according to an embodiment.

A decoding apparatus 300 may be an apparatus for reconstructing feature maps from a received bitstream and performing a task using the reconstructed feature maps.

The decoding apparatus 300 may include a reception unit 310, a decoding unit 320, a feature map reconstruction unit 330, and a task performance unit 340.

The operations and functions of the reception unit 310, the decoding unit 320, the feature map reconstruction unit 330, and the task performance unit 340 will be described in detail below.

Figure 12:
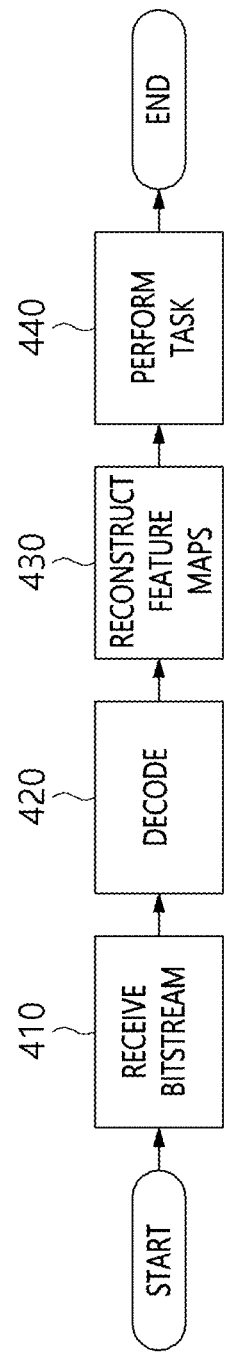
FIG. 12 is a flowchart of a decoding method according to an embodiment.

FIG. 12 is a flowchart of a decoding method according to an embodiment.

At step 410, the reception unit 310 may receive a bitstream including encoded information to another apparatus such as an encoding apparatus 100.

Alternatively, the reception unit 310 may read the encoded information from a bitstream stored in a computer-readable storage medium.

At step 420, the decoding unit 320 may reconstruct a feature frame by performing decoding on the encoded information of the bitstream.

The bitstream or encoded information may include reconstruction information. The reconstruction information may be information used to reconstruct the feature frame and/or the feature maps.

At step 430, the feature map reconstruction unit 330 may reconstruct the feature maps using the reconstructed feature frame.

At step 440, the task performance unit 340 may perform a task using the reconstructed feature maps.

Figure 13:
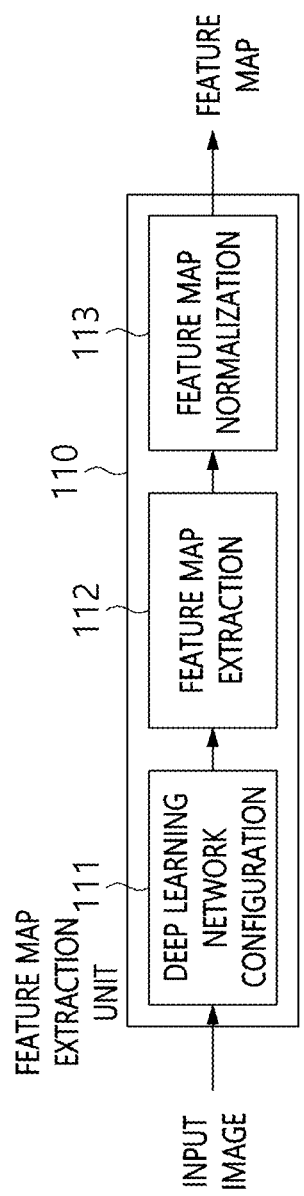
FIG. 13 illustrates the operation of a feature map extraction unit according to an embodiment.

FIG. 13 illustrates the operation of the feature map extraction unit according to an embodiment.

The feature map extraction unit 110 may perform deep learning network configuration step 111, feature map extraction step 112, and feature map normalization step 113.

At step 111, the feature map extraction unit 110 may configure a deep learning network.

At step 111, the deep learning network may mean a deep learning network that is currently utilized for the operation of the encoding apparatus 100.

The configuration of the deep learning network may include training (learning) of the deep learning network.

Alternatively, step 110 may mean that training or configuration of the deep learning network has been completed and the deep learning network has been prepared.

At step 112, the feature map extraction unit 110 may extract a multi-channel feature map from a target layer of the deep learning network.

In embodiments, a feature map may be the multi-channel feature map, or part of the multi-channel feature map, or may mean one of multi-channel feature maps. In embodiments, the term "multi-channel feature map" and the term "feature map" may be used interchangeably with each other.

The target layer may include one or more layers from which the multi-channel feature map is extracted from multiple layers of the deep learning network. In other words, the target layer may be a layer having multi-channel feature map desired to be extracted by the feature map extraction unit 110.

The target layer may include multiple layers. Processing related to layers described in embodiments may be individually performed on each of the multiple target layers.

At step 113, the feature map extraction unit 110 may generate a normalized multi-channel feature map by normalizing the multi-channel feature map.

Normalization of each multi-channel feature map may be a process of converting the corresponding multi-channel feature map composed of real numbers into a multi-channel feature map composed of integers depending on the quantization size.

The quantization size may refer to a quantization bit depth. Depending on the quantization bit depth set for encoding, $2^{bitdepth}$ quantization numbers may be identified.

For example, as shown in the following Equation (1), a feature map $F_{origin}$ before being converted may be divided by the 'range value ($Range_{max}$)' from the minimum value to the maximum value of the feature map'. The variable of 'maximum quantization value ($2^{bitdepth}-1$)' may be multiplied by the result of division. Rounding-off may be applied to the result of multiplication. Finally, '$2^{bitdepth}-1$' is added to the result of rounding-off, and thus a normalized feature map $F_{convert}$ may be generated.

$$F_{convert} = \text{Round}\left(\frac{F_{origin}}{Range_{max}}(2^{bitdepth}-1)\right) + 2^{bitdepth-1} \quad (1)$$

All values in the normalized feature map may be values normalized to positive numbers.

Here, a value smaller than 0 in the feature map may be set to '0'. A value greater than the 'maximum quantization value ($2^{bitdepth}-1$)' in the feature map may be set to '$2^{bitdepth}-1$'. After these setting processes are performed, all values in the feature map may be equal to or greater than 0, and may be less than or equal to '$2^{bitdepth}-1$'.

In other embodiments, normalization of each feature map may not be limited only to the scheme shown in Equation (1). As shown in the following Equation (2), various normalization methods such as by performing a normalization process using the minimum value min(F) and the maximum value max (F) in the multi-channel feature map, may be used to normalize feature maps.

$$F_{convert} = \frac{F_{original} - \min(F)}{\max(F) - \min(F)} \times (2^{bitdepth}-1) \quad (2)$$

In embodiments, the feature map may be the normalized feature map generated at step 113.

Figure 14:
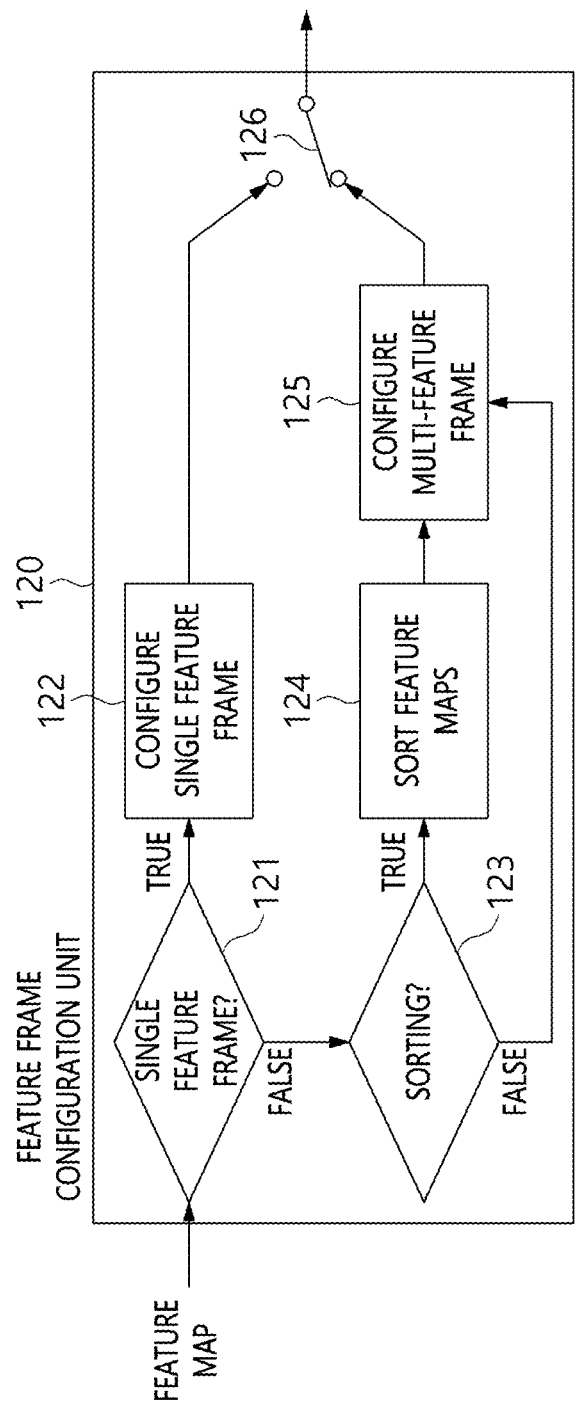
FIG. 14 illustrates the configuration of a frame configuration unit according to an embodiment.

FIG. 14 illustrates the operation of the feature frame configuration unit according to an embodiment.

The feature frame configuration unit 120 may perform single feature frame checking step 121, single feature frame configuration step 122, feature map sorting checking step 123, feature map sorting step 124, and multi-feature frame configuration step 125.

At step 121, the feature frame configuration unit 120 may determine which of a single feature frame and multi-feature frames are to be generated using the normalized multi-channel feature map generated at step 113.

A single feature frame may correspond to one image. The multi-feature frames may correspond to multiple images. In other words, the multi-feature frames may correspond to a video or part of the video. The multi-feature frames may correspond to multi-feature frames.

The feature map may be a (normalized) multi-channel feature map.

The feature frame configuration unit 120 may determine which of a single feature frame and multi-feature frames are to be configured using the feature map based on the horizontal size of the feature map, the vertical size of the feature map, and the number of channels of the feature map.

Configuring a single feature frame using the feature map may mean that multi-channel feature maps are converted into a single feature frame.

Configuring multi-feature frames using the feature map may mean that multi-channel feature maps are converted into multi-feature frames.

The determination about which of a single feature frame and multi-feature frames are to be generated may be performed based on the following Equations (3), (4), and (5).

$$W_f \times 2^{n_1} > W_{th} \quad (3)$$

$$H_f \times 2^{n_2} > H_{th} \quad (4)$$

$$n_1 + n_2 \leq \log_2 C \quad (5)$$

In Equation (3), $W_f$ denotes the horizontal size (width) of the corresponding feature map. $W_{th}$ may be a predefined first size.

In Equation (4), $H_f$ denotes the vertical size (height) of the corresponding feature map. $H_{th}$ may be a predefined second size.

In Equations (3), (4), and (5), $n_1$ may denote the number of feature maps allocated in the horizontal direction of a feature frame upon configuring the feature frame. $n_2$ may denote the number of feature maps allocated in the vertical direction of a feature frame upon configuring the feature frame. In other words, the feature frame may include $n_1*n_2$ feature maps, wherein the horizontal length of the feature frame may be $n_1$ times the horizontal length of each feature map, and the vertical length of the feature frame may be $n_2$ times the vertical length of each feature map. Alternatively, $n_1$ may denote the number of columns corresponding to feature maps in the feature frame. $n_2$ may denote the number of rows corresponding to feature maps in the feature frame.

In Equation (5), C may denote the number of multi-channel feature maps or the number of channels. In embodiments, the number of multi-channel feature maps and the number of channels may be used interchangeably with each other.

Equation (3) may show a process of determining whether the horizontal size $W_f$ of the feature maps is greater than 'predefined first size $W_{th}/2^n$'. Here, n may be $n_1$ in Equation (5).

Equation (4) may show a procedure of determining whether the vertical size $H_f$ of the feature maps is greater than 'predefined second size $H_{th}/2^n$' may be $n_2$ in Equation (5).

Equation (5) may indicate that the multiplication of the number of feature maps $n_1$ allocated in the horizontal direction of the feature frame by the number of feature maps $n_2$ allocated in the vertical direction of the feature frame upon configuring the feature frame is limited by the number C of feature maps. $n_1$ and $n_2$ may be determined by the number of multi-channel feature maps.

The 'predefined first size $W_{th}$' and the 'predefined second size $H_{th}$' may be defined depending on the characteristics of the compressor for compressing the feature maps. In embodiments, the compressor may refer to a compression encoder.

The compressor in embodiments includes a normal video compression codec, such as High Efficiency Video Coding (HEVC) and Versatile Video Coding; (VVC), and includes a compressor based on deep learning-based image compression technology.

At step 121, a scheme for determining the configuration of the feature frame may not be limited to the above-described scheme. For example, one of a single feature frame and multi-feature frames may be selected based on the result of performance relative to compression depending on the size of an experimentally calculated feature frame configuration.

A feature frame flag may indicate which of a single feature frame and multi-feature frames are to be generated.

The feature frame configuration unit 120 may set the value of the feature frame flag depending on which of a single feature frame and multi-feature frames are to be generated. The feature frame flag may indicate which of a single feature frame and multi-feature frames have been generated.

The bitstream generated by the encoding apparatus 100 may include the feature frame flag or information indicating the feature frame flag.

The reconstruction information may include the feature frame flag.

When it is determined at step 121 that a single feature frame is to be generated, step 122 may be performed.

At step 122, the feature frame configuration unit 120 may configure a single feature frame.

When it is determined at step 121 that multi-feature frames are to be generated, step 123 may be performed.

At step 123, the feature frame configuration unit 120 may determine whether sorting of the feature maps is to be performed.

When it is determined at step 123 that sorting of feature maps is to be performed, step 124 may be performed.

When it is determined at step 123 that sorting of feature maps is not to be performed, step 125 may be performed.

The feature frame configuration unit 120 may set the value of a sorting flag depending on whether sorting of the feature maps is to be performed.

The sorting flag may indicate whether sorting of the feature maps is performed. Alternatively, the sorting flag may indicate whether reconstruction sorting corresponding to sorting is required for the feature maps.

Reconstruction information may include the sorting flag.

At step 124, the feature frame configuration unit 120 may perform sorting of the feature maps.

The feature frame configuration unit 120 may generate sorted feature maps by performing sorting of feature maps.

The feature frame configuration unit 120 may generate sorting order information. The sorting order information may be information indicating how the feature maps have been sorted.

The reconstruction information may include the sorting order information.

The sorting order information may be information indicating changes in the locations of multiple feature maps attributable to sorting.

For example, the sorting order information may include the number (or index) of each of multiple feature maps before being sorted and the number (index) of each of the multiple feature maps after being sorted.

For example, the sorting order information may indicate the number (or index) of each of multiple feature maps before being sorted.

Alternatively, the sorting order information may be information may be information used to reconstruct the sorted feature maps in the order of the feature maps before being sorted.

At step 125, the feature frame configuration unit 120 may configure multi-feature frames.

The feature frame configuration unit 120 may configure multi-feature frames using (unsorted) feature frames which have not undergone step 124. Alternatively, the feature frame configuration unit 120 may configure multi-feature frames using sorted feature frames which have undergone step 124.

At step 126, the feature frame configuration unit 120 may output a single feature frame generated at step 122 or multi-feature frames generated at step 125.

Figure 15:
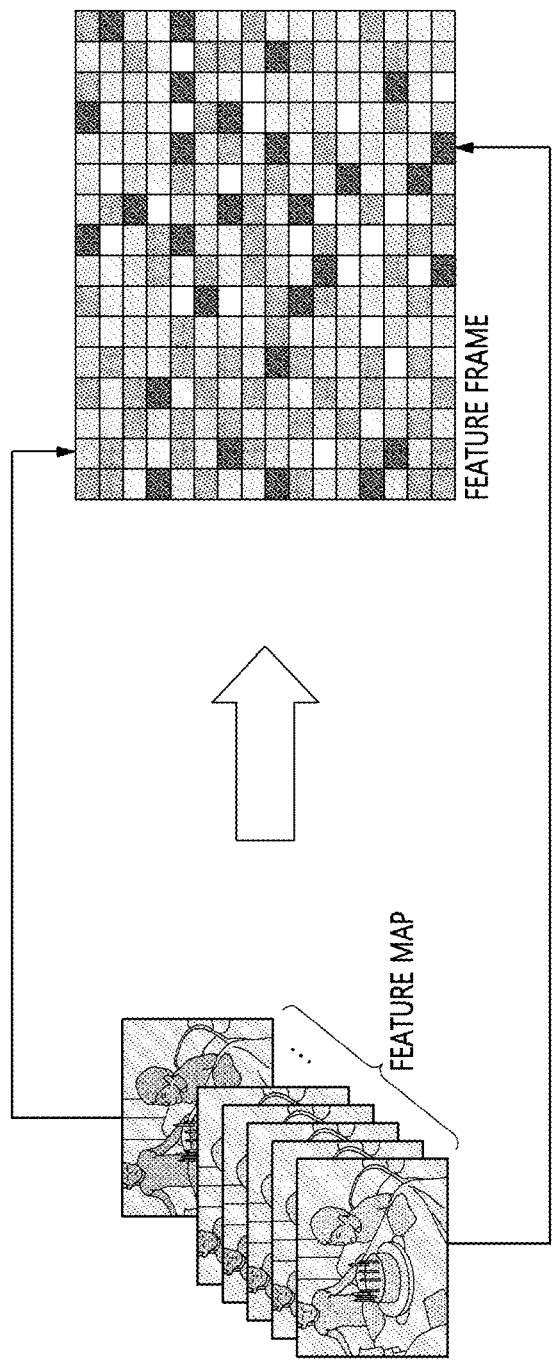
FIG. 15 illustrates the generation of a single feature frame according to an example.

FIG. 15 illustrates the generation of a single feature frame according to an example.

Step 122 of configuring a single feature frame may indicate a process in which, when a single feature frame is selected at the previous single feature frame checking step 121, a single feature frame is generated.

As illustrated in FIG. 15, the feature frame configuration unit 120 may generate a single feature frame by arranging $n_1$ feature maps in a horizontal direction and $n_2$ feature maps in a vertical direction to form a grid shape. In other words, a single feature frame may include multiple feature maps, and the multiple feature maps in the feature frame may form $n_1$ columns and $n_2$ rows.

Here, the multiplication of $n_1$ and $n_2$ may be identical to the total number of multi-channel feature maps. Further, basically, an ordered pair ($n_1$ and $n_2$) may be selected such that the absolute value of the difference between $n_1$ and $n_2$ is minimized. In other words, $n_1$ and $n_2$ may be equal to each other. Basically, a single feature frame having a shape close to a square may be preferred.

Feature map sorting checking step 123 may indicate a process of determining whether sorting is to be applied to the process of generating the multi-feature frames when, at the single feature frame checking step 121, multi-feature frames are selected.

Generally, compression of feature frames generated using sorted multi-channel feature maps may show higher compression performance than that of feature frames generated using unsorted multi-channel feature maps.

On the other hand, when sorting of multi-channel feature maps is used, a variable for storing the order of feature maps is required, and additional memory allocation for such a variable is required. Therefore, usage of sorting of multi-channel feature maps may not always guarantee higher compression performance.

Accordingly, in embodiments, sorting of multi-channel feature maps may be selectively performed. For example, sorting of multi-channel feature maps may be selectively performed only when higher compression performance is derived or guaranteed.

The feature frame configuration unit 120 may determine whether sorting is to be applied to feature maps based on the size of feature maps.

Alternatively, the feature frame configuration unit 120 may determine whether sorting is to be applied to feature maps according to a specific rule based on statistical experience by a user.

For example, the feature frame configuration unit 120 may generate first multi-feature frames for feature maps to which sorting is applied (i.e., sorted feature maps), and second multi-feature frames for feature maps to which sorting is not applied, and may select one of the first multi-feature frames and the second multi-feature frames.

The encoding apparatus 100 or the feature frame configuration unit 120 may compare a first result of first encoding using the first multi-feature frames with a second result of second encoding using second multi-feature frames, and may select one of the first multi-feature frames and second multi-feature frames based on the comparison between the first result and the second result.

For example, the encoding apparatus 100 or the feature frame configuration unit 120 may reselect feature frames, showing higher coding efficiency, from among the first multi-feature frames and the second multi-feature frames when the feature frames are encoded by the encoding unit 130.

Figure 16:
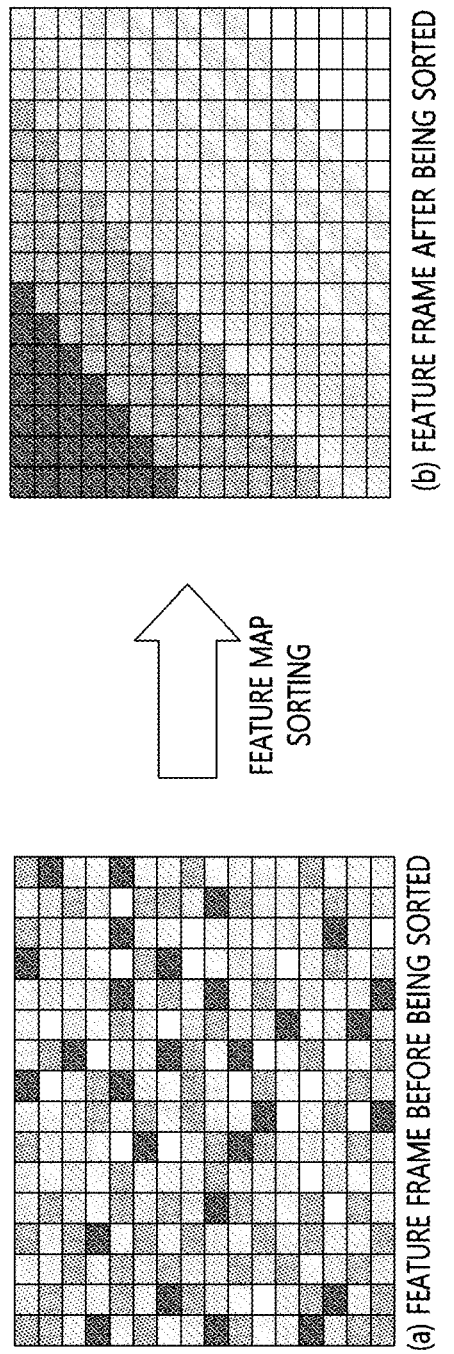
FIG. 16 illustrates the sorting of feature maps according to an example.

FIG. 16 illustrates the sorting of feature maps according to an example.

If it is determined at the feature map sorting checking step 123 that sorting of multi-channel feature maps is efficient, sorting of multi-channel feature maps may be performed based on a specific criterion for the multi-channel feature maps at the feature map sorting step 124.

As illustrated in FIG. 16, the multi-channel feature maps may be sorted in accordance with the specific sorting rule.

In embodiments, the purpose of performing sorting in accordance with a specific criterion may be to sort feature maps so that similar feature maps are clustered, as illustrated in FIG. 16, thus improving compression efficiency at the encoding step 230. In this aspect, a sorting method according to embodiments is not limited to a specific method, and various sorting methods may be used to sort the multi-channel feature maps.

For example, the feature frame configuration unit 120 may sort feature maps based on the average brightness values of the feature maps. Here, the specific criterion may be an ascending order or a descending order.

For example, the feature frame configuration unit 120 may sort feature maps based on the local brightness values of the feature maps.

For example, the feature frame configuration unit 120 may sort feature maps based on the average brightness values of the feature maps.

In addition, for example, the feature frame configuration unit 120 may sort feature maps based on the specific characteristics of the feature maps, described in embodiments.

Figure 17:
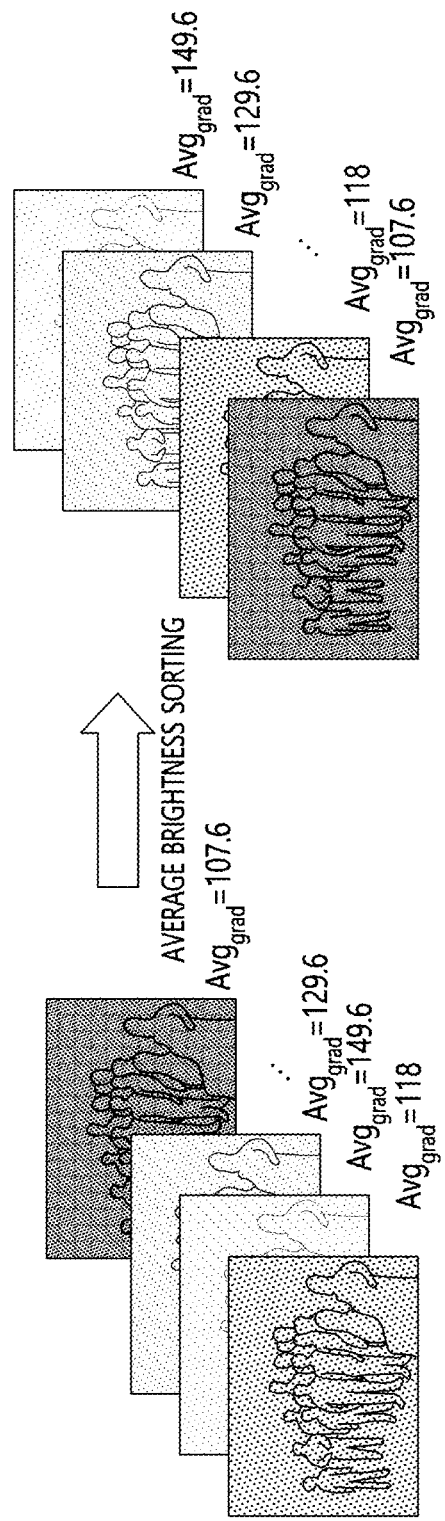
FIG. 17 illustrates a method for sorting feature maps based on the average brightness of feature maps according to an embodiment.

FIG. 17 illustrates a method for sorting feature maps based on the average brightness of feature maps according to an embodiment.

The feature frame configuration unit 120 may sort the feature maps based on the average brightness values of the feature maps.

In a method for sorting multi-channel feature maps based on the average brightness of the multi-channel feature maps, the following Equation (6) indicates a method for calculating the average brightness of the feature maps.

$$Avg_{grad} = \frac{1}{XY}\sum_{i=1}^{Y}\sum_{j=1}^{X}f(i,j) \tag{6}$$

f denotes feature maps.

X denotes the horizontal size of the feature maps.

Y denotes the vertical size of the feature maps.

f(i, j) denotes brightness at coordinates (i, j) of each feature map.

$Avg_{grad}$ may indicate the average brightness of the corresponding feature map.

As illustrated in FIG. 17, when the average brightness $Avg_{grad}$ of each feature map is calculated, the feature frame configuration unit 120 may sort the feature maps based on the average brightness values of the feature maps by comparing the average brightness values with each other.

Figure 18:
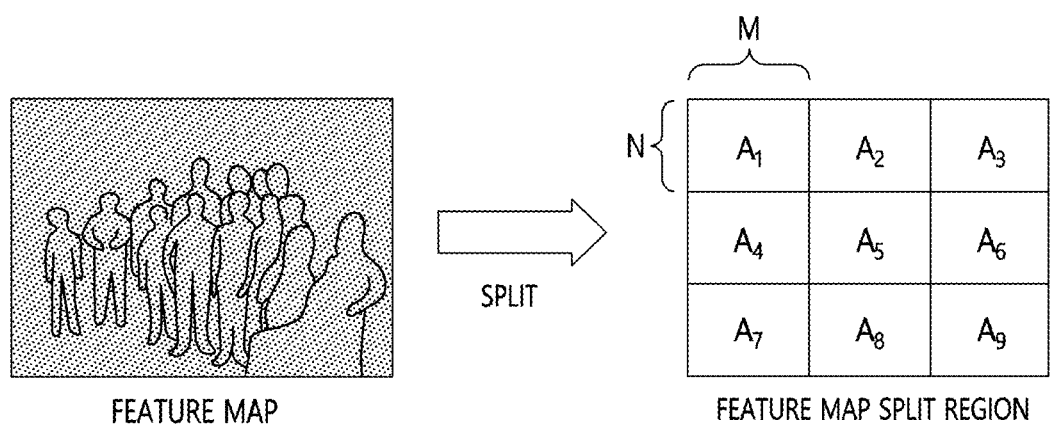
FIG. 18 illustrates a method for sorting feature maps based on the local brightness of a multi-channel feature map according to an embodiment.

FIG. 18 illustrates a method for sorting feature maps based on the local brightness of a multi-channel feature map according to an example.

The feature frame configuration unit 120 may sort feature maps based on the local brightness values of feature maps.

In a method for sorting multi-channel feature maps based on the local brightness of the multi-channel feature maps, the local brightness of the feature maps may be calculated, as represented by the following Equation (7):

$$Loc_{grad} = \sum_{i=1}^{K}\alpha_i A_i \tag{7}$$

A feature map f having a horizontal size of X and a vertical size of Y may be split into k regions, each having a horizontal size of N and a vertical size of M.

$A_i$ may be the average brightness $Avg_{grad}$ of an i-th region, among the K regions. As described above with reference to Equation (6), the feature frame configuration unit 120 may calculate the average brightness of the split region (or partitioned region) of the corresponding feature map.

$\alpha_i$ denotes a weight of $A_i$. In other words, $\alpha_i$ may be the importance weight of the i-th region.

$Loc_{grad}$ may be the local brightness of the corresponding feature map. $Loc_{grad}$ may be a weighted sum of average brightness values of K regions.

The feature frame configuration unit 120 may sort the feature maps based on the local brightness values of the feature maps. Here, the criterion may indicate an ascending order or a descending order.

For example, as illustrated in FIG. 13, the feature frame configuration unit 120 may split one feature map into nine regions, and may derive the local brightness values of the split regions. When the feature map is split into nine regions $A_1$ to $A_9$, $Loc_{grad}$ may be $\alpha_1 A_1 + \alpha_2 A_2 + \alpha_3 A_3 + \alpha_4 A_4 + \alpha_5 A_5 + \alpha_6 A_6 + \alpha_7 A_7 + \alpha_8 A_8 + \alpha_9 A_9$.

Here, as the difference between $\alpha_i$ values is smaller, the feature maps may be sorted in a way more similar to that of the method for sorting the feature maps based on the average brightness values of feature maps, described above with reference to FIG. 17. As the difference between $\alpha_i$ values is greater and the number of split regions is larger, the feature maps may be more definitely classified.

The feature frame configuration unit 120 may combine sorting using the average brightness of feature maps with sorting using the local brightness of feature maps. The feature frame configuration unit 120 may perform primary sorting of feature maps using the average brightness values of the feature maps. When the feature maps are primarily sorted, the feature frame configuration unit 120 may perform secondary sorting using local brightness on feature maps having the same average brightness, among the sorted feature maps. Here, for usefulness of secondary sorting for the primary sorting that is previously performed, $\alpha_i$ values having relatively large differences may be used in secondary sorting.

Figure 19:
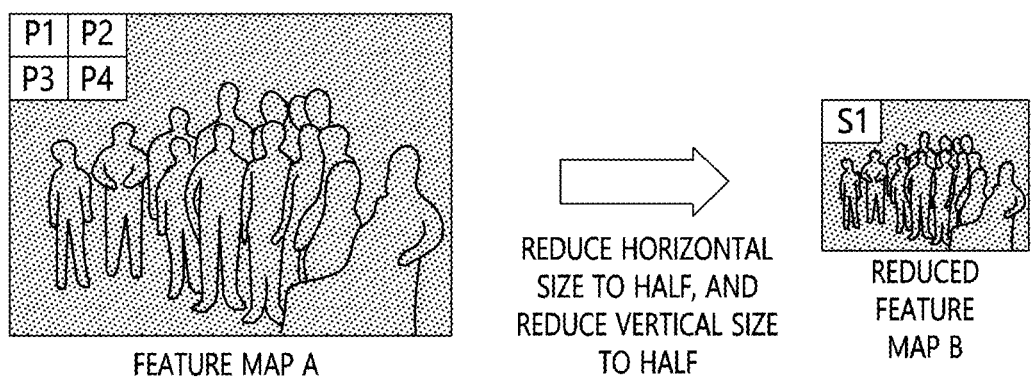
FIG. 19 illustrates a method for sorting feature maps based on the average brightness of a reduced multi-channel feature map according to an embodiment.

FIG. 19 illustrates a method for sorting feature maps based on the average brightness of a reduced multi-channel feature map according to an embodiment.

The feature frame configuration unit 120 may generate reduced feature maps by reducing the feature maps, and may sort the feature maps based on the average brightness values of the reduced feature maps.

In the method for sorting feature maps based on the average brightness values of the reduced feature maps, the average brightness of each reduced feature map may be calculated, as represented by the following Equation (8):

$$S_{ij} = \frac{1}{UV} \sum_{u=1}^{U} \sum_{v=1}^{V} f_{uv} \tag{8}$$

In the case of a feature map f having a horizontal size of X and a vertical size of Y, the horizontal size may be reduced to V times the horizontal size X and the vertical size may be reduced to U times the vertical size Y.

As described in Equation (8), a reduced average pixel S for U*V pixels corresponding to U pixels in a horizontal direction and V pixels in a vertical direction may be calculated. In other words, S may be the average of brightness values of U*V pixels.

i may be an x coordinate value of a reduced average pixel $S_{ij}$. j may be a y coordinate value of the reduced average pixel $S_{ij}$.

When the brightness values of pixels in the reduced feature map are calculated, the average brightness of the reduced feature map composed of reduced average pixels may be calculated. Upon calculating the average brightness of the reduced feature map, the foregoing Equation (6) may be used.

For example, as shown in FIG. 19, reduced feature map B may be generated by reducing feature map A to half in a horizontal direction and half in a vertical direction, and the average brightness of the reduced feature map B may be calculated. The average brightness of the reduced feature map B may be used as a criterion for sorting of feature map A.

FIG. 20 illustrates compressibility depending on the number of feature maps constituting a multi-feature frame in the present disclosure.

FIG. 21 illustrates the results of Peak Signal-to-Noise Ratio (PSNR) depending on the number of feature maps constituting a multi-feature frame in the present disclosure.

In FIG. 20, compressibility values depending on the number of allocated feature maps in a horizontal direction and the number of allocated feature maps in a vertical direction are illustrated.

In FIG. 21, PSNR values depending on the number of allocated feature maps in a horizontal direction and the number of allocated feature maps in a vertical direction are illustrated.

At multi-feature frame configuration step 125, the feature frame configuration unit 120 may generate a feature frame using sorted multi-channel feature maps or unsorted multi-channel feature maps.

Here, the feature map may include multiple feature maps. The generated feature frame may include multi-feature frames.

In the multi-feature frames, the number of feature frames may be calculated using the following Equation (9):

$$N_{Frame} = \frac{C}{n_1 \times n_2} \tag{9}$$

$N_{Frame}$ may indicate the number of feature frames.

C may be the total number of feature maps.

$n_1$ may indicate the number of feature maps allocated in the horizontal direction of the corresponding feature frame when the feature frame is configured. $n_2$ may indicate the number of feature maps allocated in the vertical direction of the corresponding feature frame when the feature frame is configured. In other words, the feature frame may include $n_1 * n_2$ feature maps, the horizontal length of the feature frame may be $n_1$ times the horizontal length of the feature map, and the vertical length of the feature frame may be $n_2$ times the vertical length of the feature map. Alternatively, $n_1$ may indicate the number of columns corresponding to the feature maps in the feature frame. $n_2$ may indicate the number of rows corresponding to the feature maps in the feature frame.

For example, when the total number of multi-channel feature maps is 256, if four feature maps are allocated in a horizontal direction and four feature maps are allocated in a vertical direction to configure one feature frame, 16 feature frames may be required.

As illustrated in FIGS. 20 and 21, compression performance in a compressor may be changed depending on the method for establishing the number of allocation feature maps forming the multi-feature frames. The number of allocation of feature maps may indicate $n_1$ and $n_2$, which are represented by an ordered pair $(n_1, n_2)$.

The feature frame configuration unit 120 may establish the number of allocation of feature maps forming the feature frame based on the statistical experience of the user depending on the size of the feature maps.

The feature frame configuration unit 120 may generate multi-feature frames using the multiple allocation numbers, and may select one from among the multi-feature frames. The multiple allocation numbers may indicate multiple ordered pairs $(n_1, n_2)$.

The criterion for selection may be coding efficiency. The feature frame configuration unit 120 may select a feature frame showing the highest coding efficiency from among the multi-feature frames.

For example, the feature frame configuration unit 120 may generate multi-feature frames using the multiple allocation numbers. The encoding apparatus 100 or the feature frame configuration unit 120 may reselect a feature frame, showing the highest coding efficiency when being encoded by the encoding unit 130, from among the multi-feature frames corresponding to different allocation numbers.

The feature frame configuration unit 120 may individually generate, for each of multiple ordered pairs $(n_1, n_2)$, a feature frame including a number of feature maps corresponding to the ordered pair, and the encoding unit 130 may perform encoding on the feature frame. The encoding apparatus 100 or the feature frame configuration unit 120 may select a feature frame showing the highest coding efficiency from among the feature frames generated for the multiple ordered pairs.

FIGS. 22, 23, 24, 25, 26, and 27 illustrate methods for generating multi-feature frames using sorted multi-channel feature maps according to examples.

Figure 22:
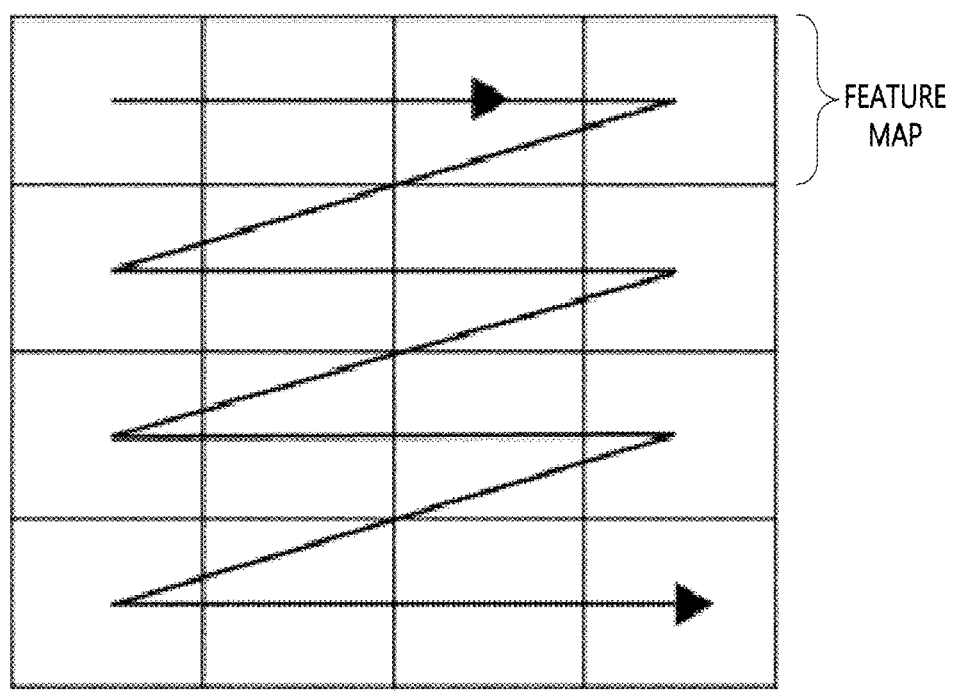
FIG. 22 illustrates a first method for generating multi-feature frames using sorted multi-channel feature maps according to an example.

FIG. 22 illustrates a first method for generating multi-feature frames using sorted multi-channel feature maps according to an example.

Figure 23:
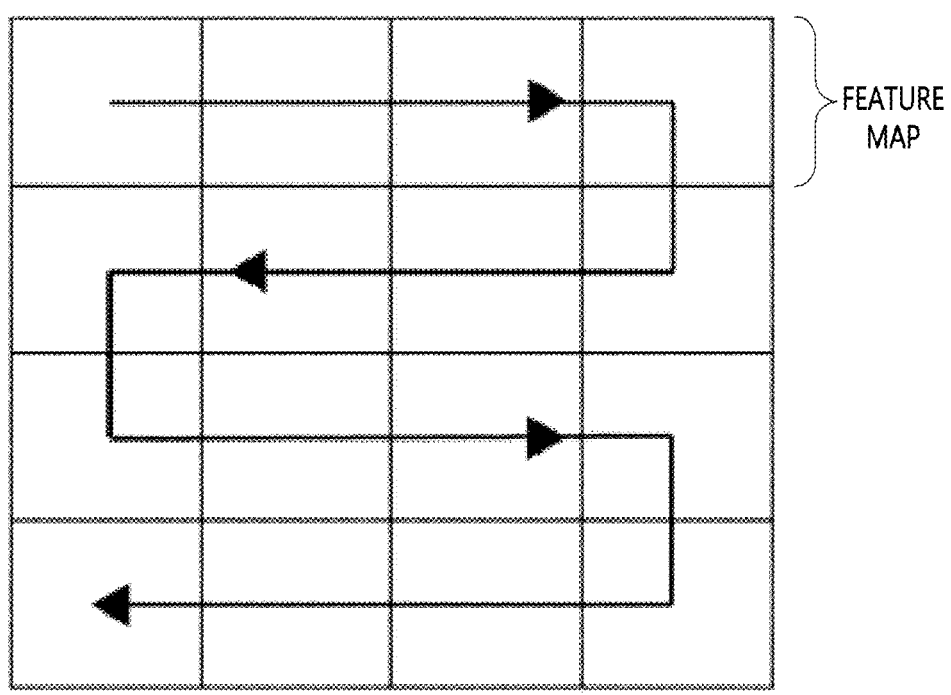
FIG. 23 illustrates a second method for generating multi-feature frames using sorted multi-channel feature maps according to an example.

FIG. 23 illustrates a second method for generating multi-feature frames using sorted multi-channel feature maps according to an example.

Figure 24:
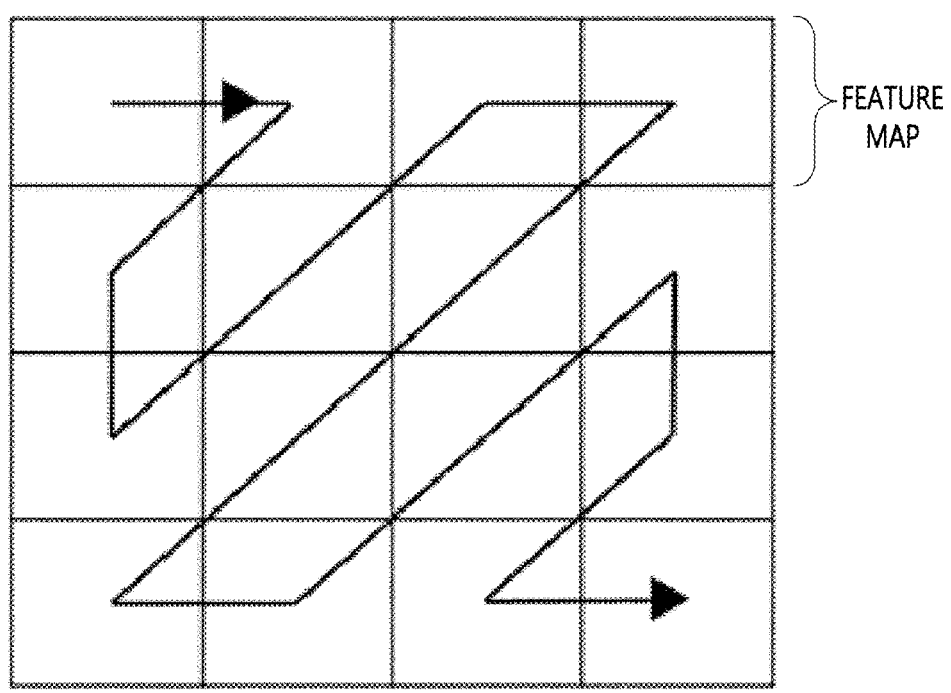
FIG. 24 illustrates a third method for generating multi-feature frames using sorted multi-channel feature maps according to an example.

FIG. 24 illustrates a third method for generating multi-feature frames using sorted multi-channel feature maps according to an example.

Figure 25:
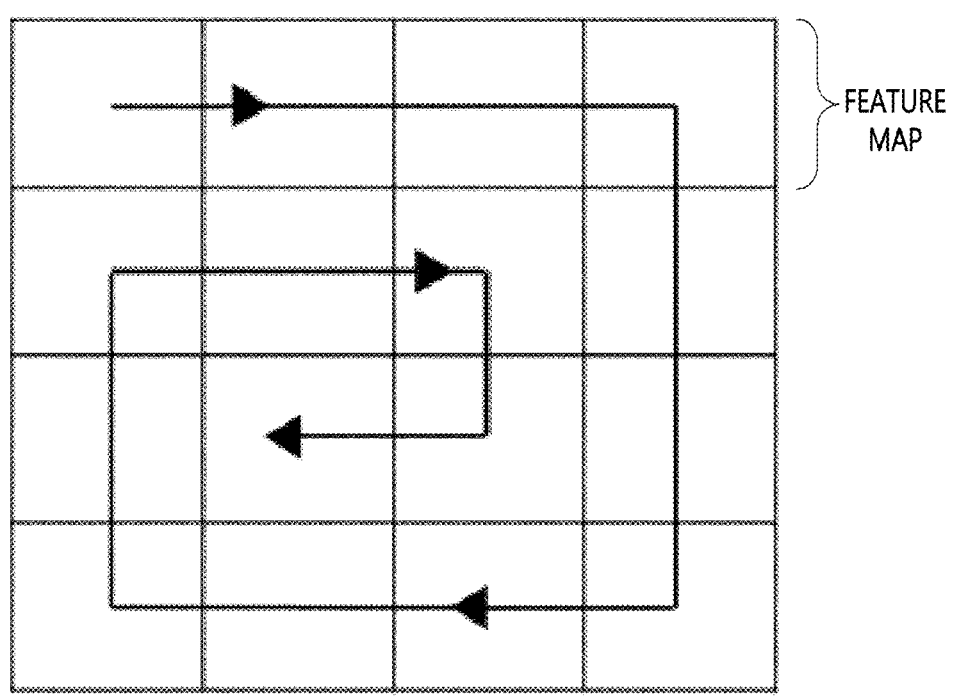
FIG. 25 illustrates a fourth method for generating multi-feature frames using sorted multi-channel feature maps according to an example.

FIG. 25 illustrates a fourth method for generating multi-feature frames using sorted multi-channel feature maps according to an example.

Figure 26:
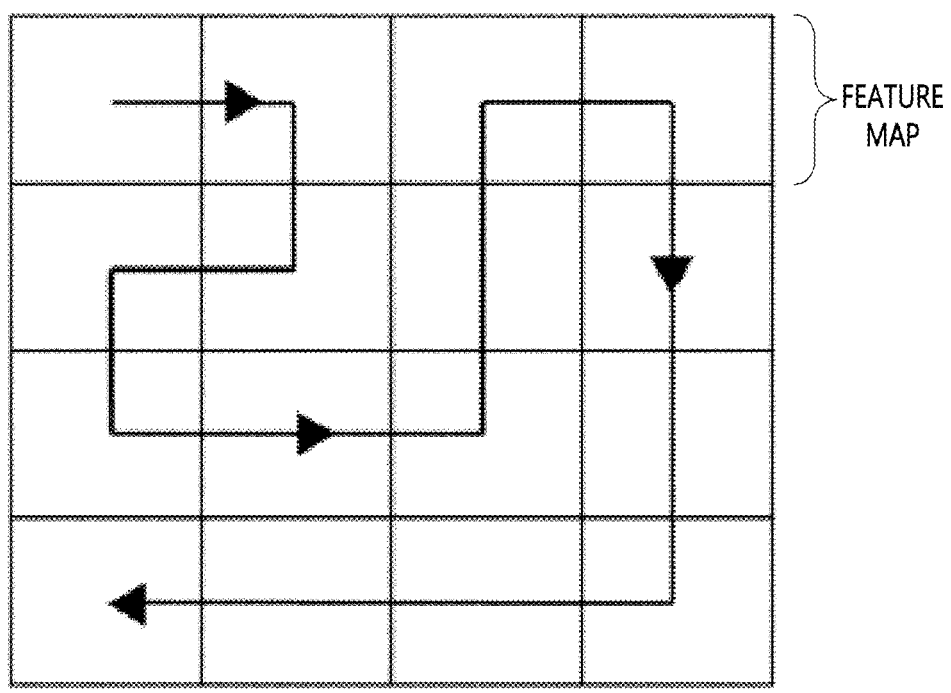
FIG. 26 illustrates a fifth method for generating multi-feature frames using sorted multi-channel feature maps according to an example.

FIG. 26 illustrates a fifth method for generating multi-feature frames using sorted multi-channel feature maps according to an example.

Figure 27:
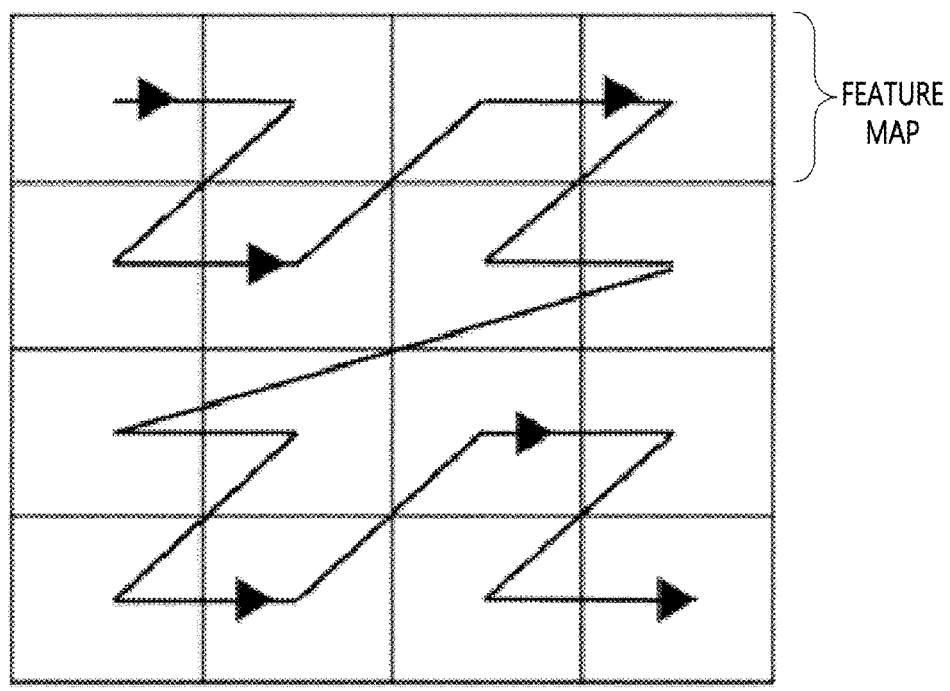
FIG. 27 illustrates a sixth method for generating multi-feature frames using sorted multi-channel feature maps according to an example.

FIG. 27 illustrates a sixth method for generating multi-feature frames using sorted multi-channel feature maps according to an example.

At step 125, the feature frame configuration unit 120 may configure multi-feature frames using the sorted multi-channel feature maps. Here, unlike the case where a single feature frame is configured using unsorted multi-channel feature maps, the feature frame configuration unit 120 may generate multi-feature frames by allocating the feature maps to the feature frame using various scan orders exemplified in FIGS. 22 to 27.

The feature frame configuration unit 120 may scan sorted feature maps in a specific order when the multi-feature frames are generated.

In FIGS. 22 to 27, arrowed lines may indicate a scan order in which the feature maps are scanned. For example, in FIGS. 22 to 27, a feature map at the location where each line starts may be scanned first, and a feature map at the location where the line finally arrives may be scanned last.

Arrows in the lines may indicate the orders or scanning directions of feature maps. The feature maps may be scanned in orders indicated by arrows in the lines. Scanning of the feature maps may progress while following lines depicted in directions pointed by the arrows. For example, a feature map in a direction pointed by an arrow may be scanned after a feature map in a direction opposite to the direction pointed by the arrow is scanned.

The first to sixth methods may indicate examples of scan orders for feature maps.

For example, in the first method, the feature frame configuration unit 120 may generate a feature frame by scanning sorted feature maps in a horizontal-first scan order or a horizontal scan order.

For example, in the second method, the feature frame configuration unit 120 may generate a feature frame by scanning sorted feature maps in a horizontal-first scan order in which a forward direction and a reverse direction alternate with each other or a horizontal scan order in which a forward direction and a reverse direction alternate with each other.

Furthermore, in the third to sixth methods, the feature frame configuration unit 120 may generate a feature frame by scanning the sorted feature maps in a specific scan order.

The scan orders, described above with reference to FIGS. 22 to 27, may be examples of scan orders for configuring multi-feature frames. The scan orders for configuring multi-feature frames may not be limited to the scan orders described above with reference to FIGS. 22 to 27.

Scan order information may indicate a specific scan order used to configure multi-feature frames. Alternatively, the scan order information may indicate the order between feature maps used to generate each feature frame.

Reconstruction information may include the scan order information.

Figure 28:
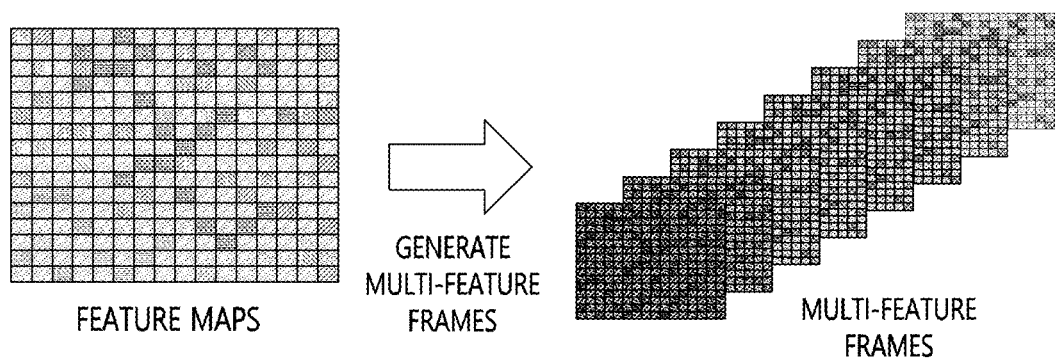
FIG. 28 illustrates multi-feature frames according to an embodiment of the present disclosure.

FIG. 28 illustrates multi-feature frames according to an embodiment of the present disclosure.

The multi-feature frames may be generated through spatial priority allocation or temporal priority allocation for feature maps, which will be described later.

For example, when there are 512 feature maps and the number of allocation of feature maps is (8, 8) (i.e., when eight feature maps are allocated in the horizontal direction of a feature frame and eight feature maps are allocated in the vertical direction of the feature frame), a total of eight multi-feature frames may be generated.

Detailed methods for generating multi-feature frames will be described in detail below.

Figure 29:
FIG. 29 illustrates the order of sorting of feature maps according to an example.
Figure 29:
Figure 29:
Figure 29:
Figure 29:
Figure 29:
Figure 29:

FIG. 29 illustrates the order of sorting of feature maps according to an example.

As illustrated in FIG. 29, all feature maps may be sorted in a specific order. After sorting, sorting numbers may be assigned to respective feature maps depending on the order of the feature maps. The sorting numbers of feature maps may indicate the sequential positions of feature maps after the feature maps are sorted.

Figure 30:
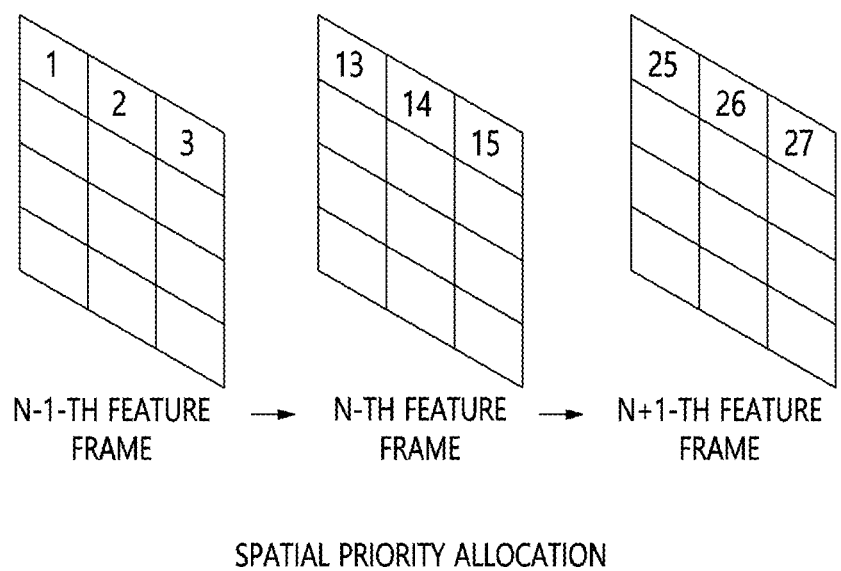
FIG. 30 illustrates spatial priority allocation according to an example.

FIG. 30 illustrates spatial priority allocation according to an example.

Spatial priority allocation may be a method for increasing a similarity between feature maps constituting one feature frame.

Spatial priority allocation may be a method for sequentially generating multi-feature frames by allocating sorted feature maps to a feature frame in a set scan order. The feature frame configuration unit 120 may sequentially generate multi-feature frames by allocating the feature maps to the feature frame in the set scan order.

When spatial priority allocation is used, if allocation of feature maps to one of the multi-feature frames, feature maps may be allocated to a subsequent feature frame.

Therefore, feature maps in each feature frame generated through spatial priority allocation may have consecutive sorting order numbers.

Figure 31:
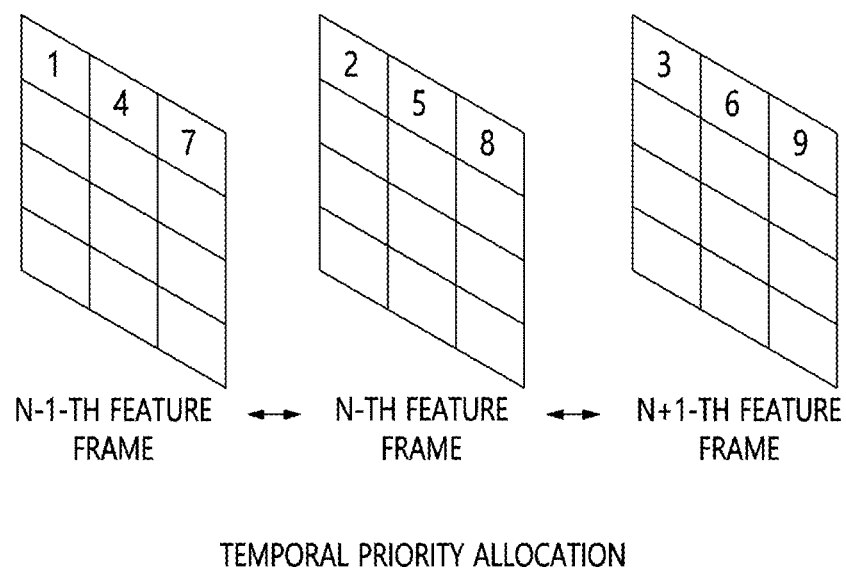
FIG. 31 illustrates temporal priority allocation according to an example.

FIG. 31 illustrates temporal priority allocation according to an example.

Temporal priority allocation may be a method for generating multi-feature frames by consecutively allocating sorted feature maps to the same locations in the multi-feature frames. Here, the same locations in the multi-feature frames may be the locations corresponding to a scan order.

When temporal priority allocation is used, the feature frame configuration unit 120 may generate multi-feature frames by consecutively allocating feature maps to the same locations in the multi-feature frames. When allocation of feature maps to respective first locations in the multi-feature frames is completed, feature maps may be allocated to subsequent locations in the multi-feature frames.

Therefore, the feature maps at the same locations in the multi-feature frames generated through temporal priority allocation may have consecutive sorting order numbers.

The feature frame configuration unit 120 may generate feature frames by utilizing one of spatial priority allocation and temporal priority allocation, which is more suitable for a compression process at compression encoding step 132, which will be described later. By means of such selection and generation, higher compression performance may be provided.

Allocation information may indicate a method for allocating feature maps used to configure each feature frame. For example, the allocation information may indicate one of temporal priority allocation and spatial priority allocation.

Reconstruction information may include the allocation information.

Figure 32:
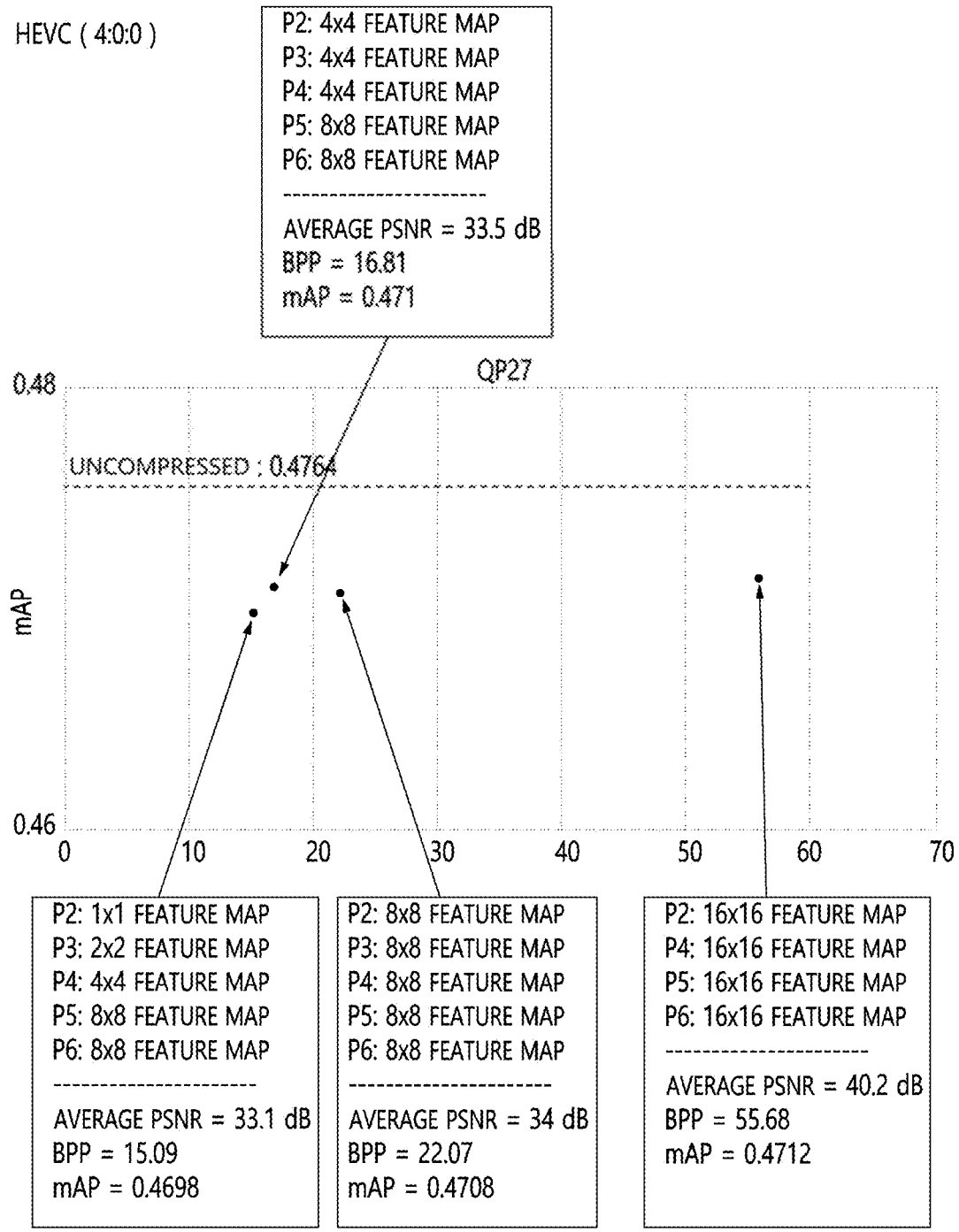
FIG. 32 illustrates a method for generating multi-feature frames when multi-channel feature maps are generated in multiple layers of a convolutional neural network.

FIG. 32 illustrates a method for generating multi-feature frames when multi-channel feature maps are generated in multiple layers of a convolutional neural network.

The convolutional neural network may include multiple layers. When multi-channel feature maps are generated by respective multiple layers due to the architecture of the convolutional neural network, the multi-feature frames may be configured using the scheme, which will be described below.

The feature frame configuration unit 120 may configure independent multi-feature frames for respective layers using multi-channel feature maps extracted from each of the multiple layers. In other words, when multi-channel feature maps are extracted from multiple layers, the feature frame configuration unit 120 may configure multi-feature frames independently of respective layers using the extracted multi-channel feature maps. In other words, the multi-feature frames may be independently configured using feature maps extracted from one of the multiple layers of the convolutional neural network.

The feature frame configuration unit 120 may independently set the number of feature maps constituting the feature frame of the corresponding layer in consideration of the horizontal size and the vertical size of feature maps in each of the multiple layers. The number of feature maps set for the multi-feature frames in the corresponding layer may be applied.

By means of this scheme, the number of feature maps constituting each of the multi-feature frames changes depending on the layers, and thus performance relative to compression may change depending on the combination of configurations of multi-feature frames applied to respective layers, such as those illustrated in FIG. 32.

Figure 33:
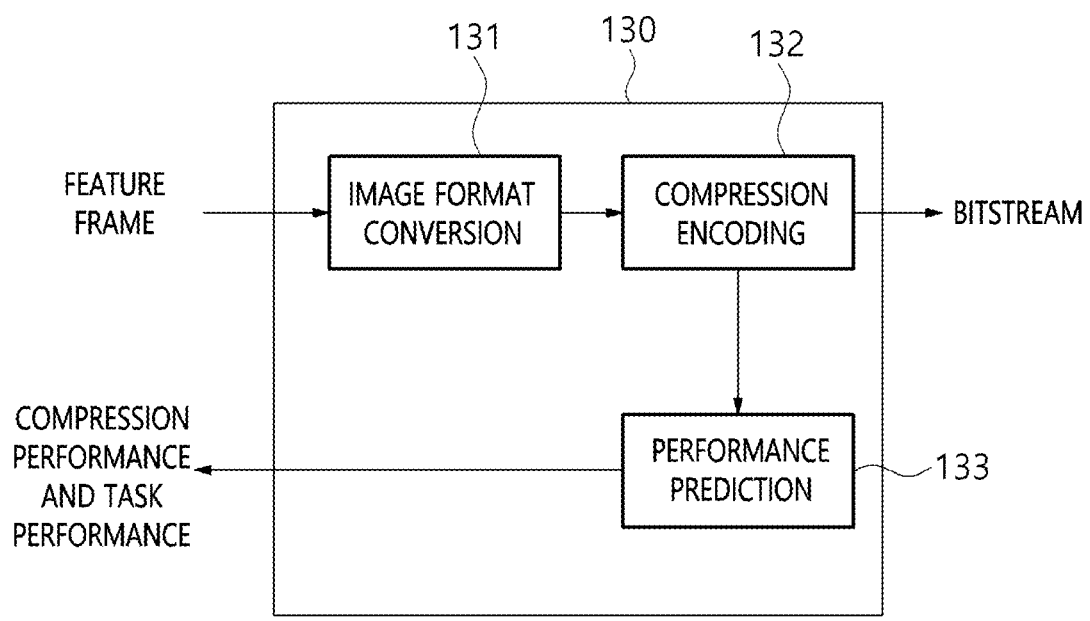
FIG. 33 illustrates the operation of an encoding unit according to an embodiment.

FIG. 33 illustrates the configuration of an encoding unit according to an embodiment.

The encoding unit 130 may perform image format conversion step 131, compression encoding step 132, and performance prediction step 133.

At step 131, the encoding unit 130 may generate feature frame information converted into a format for compression by converting a feature frame into a format required for a compressor. Here, the format for compression may be a file format.

The converted feature frame information or the feature frame information may be information indicating the feature frame, and may be information having a format for compression.

When a single feature frame is converted, the converted feature frame information may be information about a converted single feature frame.

When multi-feature frames are converted, the converted feature frame information may be information about converted multi-feature frames.

At step 132, the encoding unit 130 may generate compressed feature frame information by compressing the converted feature frame information. The encoded information may include the compressed feature frame information.

Compression of the converted feature frame information may be performed using a normal video compression codec, that is, an HEVC codec, a VVC codec, or the like, and may be performed using a deep learning-based image compression method.

The purpose of processing at step 131 may be to convert the feature frame into a file format supported by the compressor. Therefore, the format for compression may include formats provided by a video compression codec and a deep learning-based image compression method, without being limited to a specific format.

For example, when a video compression codec such as an HEVC codec or a VVC codec is used for compression, a YUV format may be designated to be used for conversion.

For example, when deep learning-based video compression technology is used for compression, various formats such as RGB, BMP, JPG, and PNG, may be designated to be used for conversion.

At step 132, the encoding unit 130 may generate compressed feature frame information by compressing the converted feature frame information using a method for compressing an image.

When (converted) single feature frame information is compressed, the compressed feature frame information may be information about a compressed single feature frame.

When (converted) multi-feature frame information is compressed, the converted feature frame information may be information about compressed multi-feature frames.

The encoding unit 130 may generate compressed single feature frame information by compressing single feature frame information or converted single feature frame information using a method of compressing a still image.

The encoding unit 130 may generate compressed multi-feature frame information by compressing information about multi-feature frames or converted multi-feature frames using a method of compressing a motion image.

The encoded information may include the compressed feature frame information.

The feature frame compressed at step 132 must be able to be reconstructed into feature maps so that the compressed feature frame can be used to perform tasks based on a deep learning network.

Therefore, the encoding unit 130 may generate reconstruction information required for supporting reconstruction into feature maps. A bitstream or encoded information may include reconstruction information.

The reconstruction information may be a Supplemental Enhancement Information (SEI) message used in the existing video codec such as an HEVC codec or a VVC codec. Alternatively, the reconstruction information may be included in the SEI message.

The reconstruction information may include the above-described sorting flag and sorting order information.

At least a part of the reconstruction information may correspond to the file name of a bitstream or the file name of a specific file in the bitstream.

For example, the value of the sorting flag may be determined depending on a character at a specific location of the file name of a specific file in the bitstream. Alternatively, the value of the sorting flag may be used to determine the character at the specific location of the file name of the specific file in the bitstream.

At step 133, the encoding unit 130 may check performance relative to compression of the feature frame generated by the feature frame configuration unit 120.

The encoding unit 130 may check whether the feature frame generated by the feature frame configuration unit 120 indicates required performance relative to compression.

Such checking may be performed through various methods.

For example, when the task performance unit of the deep learning network is utilized at the deep learning network configuration step 111 performed by the feature map extraction unit 110, performance relative to compressibility may be numerically represented.

When the deep learning network performs instance segmentation at the deep learning network configuration step 111, task performance may be represented by a mean Average Precision (mAP), and the compression performance may be represented by bits per pixel (BPP). In this case, the value of mAP relative to BPP may be transferred to the feature frame configuration unit 120. The feature frame configuration unit 120 may use the received value of mAP relative to BPP to configure a feature frame.

FIG. 34 illustrates an SEI message according to an example.

FIG. 35 illustrates the syntax of an SEI message for a feature map according to an example.

The SEI message may be the above-described reconstruction information or may include the reconstruction information.

The SEI message used in the embodiments may include feature map quantization information, feature map alignment information, feature frame configuration information, etc.

The SEI message may include feature map quantization information and feature map align information.

The feature map quantization information may indicate a quantization method for feature maps. The feature map quantization information may indicate a quantization size.

The feature map quantization information may indicate an alignment method for feature maps.

The feature frame configuration information may indicate a method for configuring feature frames.

For example, the feature map quantization information may include fmq_type information and fmq_bitdepth information for features, which will be described later.

FIG. 36 illustrates the value of fmq_type according to an example.

fmq_type may be information indicating the type of quantization applied to feature maps. The value of fmq_type may be determined depending on the type of quantization applied to feature maps.

The value of fmq_type equal to 0 may indicate that quantization is not used for feature maps.

The value of fmq_type equal to 1 may indicate that minimum (min)–maximum (max) quantization is used for feature maps. When the value of fmq_type is 1, the feature map quantization information may include fmq_min and fmq_max. fmq_min may be information indicating the minimum value of min-max quantization. fmq_max may be information indicating the maximum value of min-max quantization.

The value of fmq_type equal to 2 may indicate that maximum range (max-range) quantization is used for feature maps. When the value of fmq_type is 2, the feature map quantization information may include fmq_max_range. fmq_max_range may indicate the maximum range.

The value of fmq_type equal to 3 may indicate that predefined quantization is used for feature maps. When the value of fmq_type is 3, the feature map quantization information may include fmq_num_parameters and fmq_parameter. fmq_num_parameters may be information indicating the number of quantization parameters. fmq_parameter may be information indicating the quantization parameters.

FIG. 37 illustrates the syntax of a customized SEI message for feature maps according to an example.

feature_map_align illustrated in FIG. 37 may be feature map alignment information.

feature_map_align may be information related to alignment of feature maps. feature_map_align may include fma_num_maps_width_minus1, fma_num_maps_height_minus1, fma_sorting_flag, fma_type, etc.

fma_num_maps_width_minus1 may be information indicating the number of horizontal feature maps (i.e., the number of columns) fitted to each feature frame. For example, fma_num_maps_width_minus1 may be a value obtained by subtracting 1 from the number of feature maps. The number of feature maps may indicate the number of feature maps in the width of the corresponding feature frame. Referring to FIG. 14, fma_num_maps_width_minus1 may be '$n_1-1$'.

fma_num_maps_height_minus1 may be information indicating the number of vertical feature maps (i.e., the number of rows) fitted to each feature frame. For example, fma_num_maps_height_minus1 may be a value obtained by subtracting 1 from the number of feature maps. The number of feature maps may indicate the number of feature maps in the height of the corresponding feature frame. Referring to FIG. 14, fma_num_maps_height_minus1 may be '$n_2-1$'.

fma_sorting_flag may be the above-described sorting flag. fma_sorting_flag may be information indicating whether sorting of feature maps has been performed. When sorting of feature maps is performed, feature_map_align may include fma_num_sorted_frames and fma_pre_idx.

fma_num_sorted_frames may be information indicating the number of feature frames to which sorting is applied.

fma_pre_idx[i][u][v] may be information indicating the index of a feature map located in a u+1-th column and a v+1-th row in an i+1-th feature frame before sorting is applied to the feature map. i, u, and v may start from 0. Sorting order information may include fma_pre_idx[i][u][v].

fma_align_type may be information indicating an alignment method for aligned feature maps.

FIG. 38 illustrates the values of fma_align_type according to an example.

The value of fma_align_type equal to 0 may indicate that multi-channel feature maps are configured as a single feature frame.

The value of fma_align_type equal to 1 may indicate that multi-channel feature maps are configured as multi-feature frames depending on the above-described embodiments.

When multi-feature frames are configured, various multi-feature frames may indicate specific multi-channel feature maps. In this case, feature_map_align may include fma_multi_channel_feature_map_idx of the multi-feature frames.

fma_multi_channel_feature_map_idx of the multi-feature frames may be information indicating multi-channel feature maps to which the multi-feature frames correspond.

Figure 39:
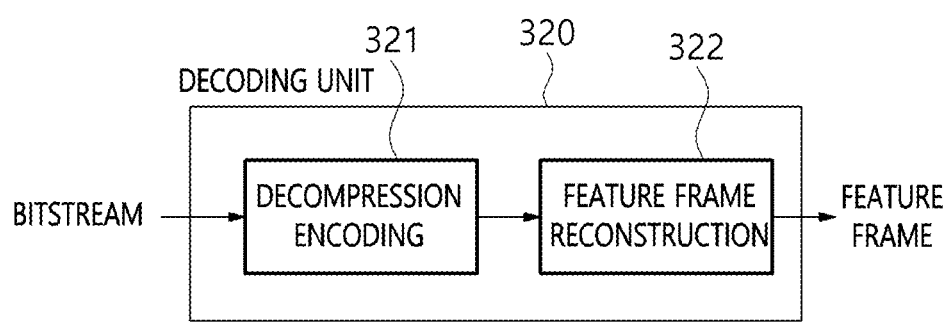
FIG. 39 illustrates the operation of a decoding unit according to an embodiment.

FIG. 39 illustrates the operation of a decoding unit according to an embodiment.

A decoding unit 320 may perform decompression decoding step 321 and feature frame reconstruction step 322.

A bitstream may include encoded information and reconstruction information, and the encoded information may include compressed feature frame information or the like. The reconstruction information may include the above-described encoding-related information.

At step 321, the decoding unit 320 may generate feature frame information by decompressing the compressed feature frame information of the bitstream. Here, the feature frame information may correspond to converted feature frame information generated at step 131. In other words, the feature frame information may be information generated by converting a feature frame into a format required by a compressor.

Decompression of the compressed feature frame information may be performed using a normal video compression codec, that is, an HEVC codec, a VVC codec, or the like, and may be performed using a deep learning-based image decompression method.

Here, the operation at step 321 may be the reverse operation of the operation at step 132. Description of compression at step 132 may also be applied to decompression at step 321. Input and output at step 132 may be regarded as output and input at step 321, respectively.

At step 322, the decoding unit 320 may reconstruct a feature frame using the feature frame information.

The decoding unit 320 may generate a (reconstructed) feature frame by reconstructing a feature frame using the reconstruction information of the bitstream.

The reconstructed frame may be a single feature frame or multi-feature frames.

The decoding unit 320 may determine which of a single feature frame and multi-feature frames are to be reconstructed using the reconstruction information of the bitstream.

The decoding unit 320 may determine which of a single feature frame and multi-feature frames are to be reconstructed using feature maps based on the horizontal size of the feature maps, the vertical size of the feature maps, and the number of channels of the feature maps.

The decoding unit 320 may determine which of a single feature frame and multi-feature frames are to be generated using a feature frame flag.

The reconstruction of the feature frame at step 322 may be the reverse operation of the operation at step 131. Description of conversion at step 131 may also be applied to reconstruction at step 322. Input and output at step 131 may be regarded as output and input at step 322, respectively.

Figure 40:
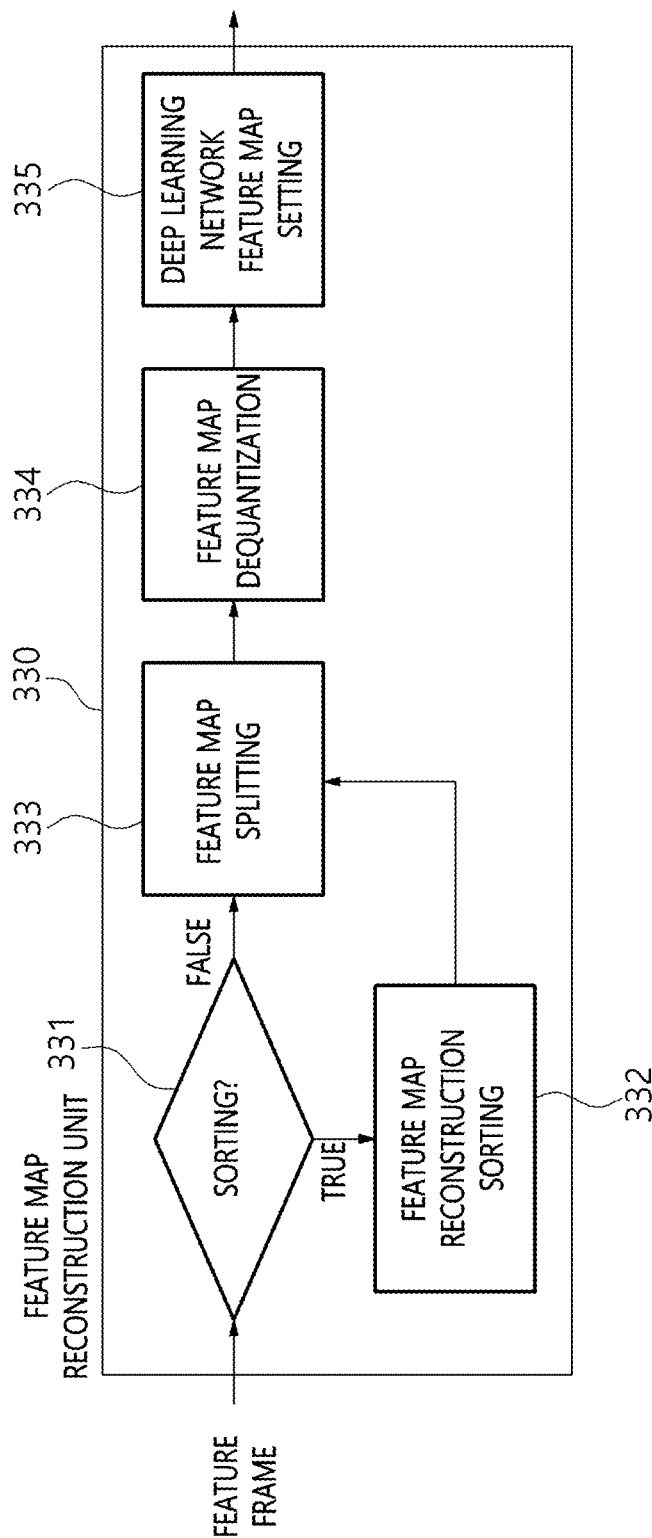
FIG. 40 illustrates the operation of a feature map reconstruction unit according to an embodiment.

FIG. 40 illustrates the operation of a feature map reconstruction unit according to an embodiment.

The feature map reconstruction unit 330 may include feature map reconstruction sorting check step 331, feature map reconstruction sorting step 332, feature frame split step 333, feature map dequantization step 334, and deep learning network feature map setting step 335.

At step 331, the feature map reconstruction unit 330 may check whether sorting of feature maps has been used in a process in which the encoding apparatus 100 generates the feature frame. Alternatively, the feature map reconstruction unit 330 may determine whether reconstruction sorting corresponding to the sorting performed on the feature maps by the encoding apparatus 100 is required when the feature frames are reconstructed.

The reconstruction sorting may be the reverse operation of sorting performed by the encoding apparatus 100. Alternatively, reconstruction sorting may be inverse-reordering relative to reordering based on sorting performed by the encoding apparatus 100.

For example, the feature map reconstruction unit 330 may determine whether reconstruction sorting is to be applied to feature maps based on the size of the feature maps.

Alternatively, the feature map reconstruction unit 330 may determine whether reconstruction sorting is to be applied to feature maps according to a specific rule based on statistical experience by a user.

The feature map reconstruction unit 330 may determine whether sorting of feature maps has been used in the process of generating a feature frame using a sorting flag, and may determine whether reconstruction sorting corresponding to the sorting performed on the feature maps by the encoding apparatus 100 is required using the sorting flag when the feature frame is reconstructed.

When the sorting flag indicates that sorting of the feature maps is performed (or when the sorting flag indicates that reconstruction sorting corresponding to sorting is required for the feature maps), the feature map reconstruction unit 330 may perform reconstruction sorting on the feature frames, and may perform step 332.

When the sorting flag indicates that sorting of the feature maps has not been performed (or when the sorting flag indicates that reconstruction sorting corresponding to sorting is not required for the feature maps), the feature map reconstruction unit 330 may not perform reconstruction sorting on the feature frames, and may perform step 333.

At step 332, the feature map reconstruction unit 330 may reconstruct the feature maps of the feature frame in an original order using sorting order information.

Here, the original order of the feature maps may be the order of feature maps before being sorted, which has been applied to the feature maps by the encoding apparatus 100 or the feature frame configuration unit 120.

At step 333, the feature map reconstruction unit 330 may generate multi-channel feature maps by splitting the feature frame. Here, the feature frame may be a feature frame, which is generated without applying sorting to feature maps, or a feature frame which is generated at step 332 and to which reconstruction sorting is applied.

Here, the feature frame may indicate multi-feature frames or may be each of multi-feature frames.

The feature map reconstruction unit 330 may use scan order information upon generating multi-channel feature maps by splitting the feature frame.

The scan order information may specify an order between the split multi-channel feature maps.

At step 333, the feature map reconstruction unit 330 may split the feature frame into feature maps. The feature map reconstruction unit 330 may split the feature maps from the feature frame in the same order as the order of feature maps used when the feature frame is configured by the encoding apparatus 110 or the feature frame configuration unit 120. That is, the feature map reconstruction unit 330 may reconstruct the order between the feature maps.

Alternatively, the feature map reconstruction unit 330 may split the feature frame into feature maps.

The feature map reconstruction unit 330 may generate multi-channel feature maps by splitting the feature maps from the feature frame.

Here, the multi-channel feature maps may correspond to multi-channel feature maps generated by the feature map extraction unit 110 of the encoding apparatus 100.

At step 334, the feature map reconstruction unit 330 may generate dequantized multi-channel feature maps by performing dequantization on the multi-channel feature maps.

Dequantization at step 334 may be the reverse operation of normalization at step 113. Description of normalization at step 113 may also be applied to dequantization at step 334. Input and output at step 113 may be regarded as output and input at step 334, respectively.

The feature map reconstruction unit 330 may convert normalized multi-channel feature maps composed of integers into (dequantized) multi-channel feature maps composed of real numbers depending on a quantization size.

In embodiments, the feature maps may mean dequantized feature maps generated at step 334.

At step 335, the feature map reconstruction unit 330 may set the feature maps of a deep learning network using the dequantized feature maps.

Setting of the feature maps at step 335 may correspond to extraction of feature maps at step 112. Description of extraction of the feature maps at step 112 may also be applied to setting of the feature maps at step 335. Input and output at step 112 may be regarded as output and input at step 335, respectively.

The feature map reconstruction unit 330 may set the dequantized feature maps for the target layer of the deep learning network. Here, the target layer may be a layer from which the feature maps are extracted at step 112. In other words, the dequantized feature maps may be set for the layer from which feature maps are extracted at step 112. By means of this setting, the feature maps of the target layer of the deep learning network may be reconstructed.

When feature maps of the deep learning network are initialized through the above-described procedures, the task performance unit 340 may perform tasks using the deep learning network.

In accordance with embodiments, a feature frame may be configured using a large amount of multi-channel feature map data generated by a deep learning network, and compression of the configured feature frame may be performed.

In accordance with embodiments, a personal/client device having memory and computation ability insufficient to store, train, and execute a deep learning network may utilize the deep learning network using compressed feature map data.

In accordance with embodiments, compression may be supported for multi-channel feature maps for all layers, as well as for multi-channel feature maps extracted from a specific layer, and the deep learning network may be utilized in distributed learning through supporting of compression.

In the above-described embodiments, it may be construed that, when specific processing is applied to a specific target, specified conditions may be required. Also, it may be construed that, when a description is made such that the specific processing is performed under specified determination, whether the specified conditions are satisfied may be determined based on a specified coding parameter and that, alternatively, when a description is made such that specific determination is made based on a specific coding parameter, the specific coding parameter may be replaced with an additional coding parameter. In other words, it may be considered that a coding parameter that influences the specific condition or the specific determination is merely exemplary, and it may be understood that, in addition to the specified coding parameter, a combination of one or more coding parameters functions as the specified coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The bitstream may include computer-executable code and/or program. The computer-executable code and/or program may include pieces of information described in embodiments, and may include syntax elements described in the embodiments. In other words, pieces of information and syntax elements described in embodiments may be regarded as computer-executable code in a bitstream, and may be regarded as at least part of computer-executable code and/or program represented by a bitstream. The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

There are provided an apparatus, a method, and a storage medium related to an artificial intelligence system that utilizes a deep learning network and an application of the artificial intelligence system.

There are provided an apparatus, a method, and a storage medium, which compress a multi-channel feature map generated by a deep learning network based on a convolutional neural network (CNN).

There are provided an apparatus, a method, and a storage medium, which efficiently compress the feature map of a deep learning network.

There are provided an apparatus, a method, and a storage medium, which configure a feature frame and compress the configured feature frame, thus exhibiting higher performance relative to compression.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. An encoding method, comprising:
   configuring multi feature frames for feature maps; and
   generating encoded information by performing encoding on the multi feature frames, wherein
   normalization of the feature maps is performed by converting real numbers composing the feature maps into integers depending on a quantization size,
   whether sorting of the feature maps is to be performed is determined when it is determined that the multi feature frames are to be generated,
   the sorting is performed based on a weighted sum of local brightness values of a feature map of the feature maps, and
   the local brightness values of the feature map are average brightness values of a plurality of regions in the feature map.

2. The encoding method of claim 1, further comprising:
   extracting the feature maps from a deep learning network.

3. The encoding method of claim 2, wherein:
   the feature maps are extracted from a layer of the deep learning network,
   normalized feature maps are generated by performing the normalization on the feature maps, and
   the normalized feature maps only comprise one or more positive integers.

4. The encoding method of claim 1, wherein which of a single feature frame and the multi feature frames are to be generated using the feature maps is determined based on a horizontal size of the feature maps, a vertical size of the feature maps, and a number of channels.

5. The encoding method of claim 1, wherein whether the sorting is to be performed is determined based on a size of the feature maps.

6. The encoding method of claim 1, wherein the feature maps are sorted based on average brightness values of reduced feature maps generated by reducing the feature maps.

7. The encoding method of claim 1, wherein sorted feature maps are scanned in a specific order upon generating the multi feature frames.

8. The encoding method of claim 1, wherein the multi feature frames are configured independently of respective multiple layers of a convolutional neural network.

9. The encoding method of claim 1, wherein:
   converted feature frame information is generated by converting the multi feature frames into a format for compression, and
   compressed feature frame information is generated by compressing the information of converted multi feature frames using a video compression codec or a deep learning-based image compression method.

10. A decoding method, comprising:
    reconstructing multi feature frames by performing decoding on encoded information; and
    reconstructing feature maps using the multi feature frames, wherein
    dequantization of the feature maps is performed by converting integer numbers composing the feature maps into real number depending on a quantization size,
    whether the feature maps are sorted is determined,
    the feature maps are sorted based on a weighted sum of local brightness values of a feature map of the feature maps in a case that the feature maps are sorted, and
    the local brightness values of the feature map are average brightness values of a plurality of regions in the feature map.

11. The decoding method of claim 10, wherein whether reconstruction sorting of the feature maps is required is determined upon reconstructing the multi feature frames.

12. The decoding method of claim 10, wherein the feature maps are generated by splitting the multi feature frames.

13. The decoding method of claim 12, wherein:
    scan order information is used upon generating the feature maps, and
    the scan order information specifies an order between the feature maps.

14. The decoding method of claim 10, wherein:
    the encoded information includes compressed feature frame information,
    feature frame information is generated by decompressing the compressed feature frame information, and
    the multi feature frames are reconstructed using the feature frame information.

15. The decoding method of claim 14, wherein the decompression is performed using a video compression codec or a deep learning-based image decompression method.

16. A non-transitory computer-readable storage medium storing a bitstream for decoding, the bitstream comprising encoded information including a computer-executable code and/or program that when executed by a computer performs the following prescribed steps including, wherein:
    multi feature frames are reconstructed by performing decoding on the encoded information, feature maps are reconstructed using the multi feature frames, and dequantization of the feature maps is performed by converting integer numbers composing the feature maps into real number depending on a quantization size, whether the feature maps are sorted is determined, the feature maps are sorted based on a weighted sum of local brightness values of a feature map of the feature maps in a case that the feature maps are sorted, and the local brightness values of the feature map are average brightness values of a plurality of regions in the feature map.

\* \* \* \* \*